United States Patent
Pokorny et al.

(10) Patent No.: US 7,136,719 B2
(45) Date of Patent: Nov. 14, 2006

(54) METHOD FOR THE COMPUTER-ASSISTED REGULATING OF A PLURALITY OF SERIALLY COUPLED MACHINES, REGULATING DEVICE AND MACHINE ARRANGEMENT

(75) Inventors: Sascha Pokorny, Haan (DE); Joachim Hennig, Dresden (DE); Joachim Meier, Leichlingen (DE); Heiner Brinkmann, Langenfeld (DE); Ralf Reifferscheidt, Duisburg (DE); Matthias Weiss, Dresden (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 11/240,910

(22) Filed: Sep. 30, 2005

(65) Prior Publication Data
US 2006/0058896 A1    Mar. 16, 2006

Related U.S. Application Data

(63) Continuation of application No. PCT/EP2004/002891, filed on Mar. 19, 2004.

(30) Foreign Application Priority Data
Mar. 31, 2003   (DE)  ................ 103 14 573

(51) Int. Cl.
*G06F 19/00* (2006.01)
*G06F 15/18* (2006.01)
*G06B 13/02* (2006.01)
*G06B 13/00* (2006.01)

(52) U.S. Cl. ............... 700/173; 700/30; 700/47; 700/49; 706/62; 318/561

(58) Field of Classification Search ........... 700/103, 700/173–175, 28–30, 47–49; 702/44; 706/62; 318/561, 567, 569–571
See application file for complete search history.

(56) References Cited

U.S. PATENT DOCUMENTS 4,481,457 A    11/1984   Zach et al.

(Continued)

FOREIGN PATENT DOCUMENTS

DE    37 01 880 C2    9/1988

(Continued)

OTHER PUBLICATIONS

T. Rädler, Modellierung und Simulation von Abfuellinien, Fortschrittsbericht VDI-Reihe 14, Nr. 93, VDI-Verlag, ISBN: 3-18-3093314-6, p. 57 (1999).

(Continued)

*Primary Examiner*—Crystal J. Barnes
(74) *Attorney, Agent, or Firm*—Stephen D. Harper; Glenn E. J. Murphy

(57) ABSTRACT

A method for stabilizing machine processes in which the machines are regulated by a machine regulation matrix selected from a plurality of machine regulation matrixes using a detected machine sensor value, set-point values of the machines being stored in each machine regulation matrix. A process is optimized according to a predefined criterion by also using some of the machine sensor values such that a machine regulation matrix which is optimal according to the process optimization is determined from the plurality of machine regulation matrixes and is subsequently used for regulating the machines.

13 Claims, 9 Drawing Sheets

U.S. PATENT DOCUMENTS

| | | | |
|---|---|---|---|
| 4,745,556 A | | 5/1988 | Turley |
| 4,987,547 A | * | 1/1991 | Rabindran et al. .......... 700/220 |
| 4,988,935 A | | 1/1991 | York |
| 5,413,651 A | * | 5/1995 | Otruba ........................ 156/64 |
| 5,560,194 A | * | 10/1996 | Shofner et al. ............... 57/264 |
| 5,712,782 A | * | 1/1998 | Weigelt et al. ................ 701/50 |
| 5,838,595 A | * | 11/1998 | Sullivan et al. ................ 703/2 |
| 5,963,003 A | | 10/1999 | Boyer |
| 6,272,391 B1 | * | 8/2001 | Maturana et al. ........... 700/103 |
| 6,315,658 B1 | * | 11/2001 | Weber ........................... 460/6 |
| 2003/0050717 A1 | | 3/2003 | Hirata et al. |

FOREIGN PATENT DOCUMENTS

| | | |
|---|---|---|
| EP | 0 745 916 A1 | 12/1996 |
| EP | 1188860 A2 * | 3/2002 |
| WO | WO 2004088439 A1 * | 10/2004 |

OTHER PUBLICATIONS

"PacSi Specification" at http://www.ika.tz-dd.de.
"ISSOP" at http://www.dualis-it.de/seiten/issopframe.html.

* cited by examiner

METHOD FOR THE COMPUTER-ASSISTED REGULATING OF A PLURALITY OF SERIALLY COUPLED MACHINES, REGULATING DEVICE AND MACHINE ARRANGEMENT

CROSS REFERENCE TO RELATED APPLICATIONS

This application is a continuation under 35 U.S.C. § 365(c) and 35 U.S.C. § 120 of international application PCT/EP2004/002891, filed on Mar. 19, 2004. This application also claims priority under 35 U.S.C. § 119 of DE 103 14 573.7, filed Mar. 31, 2003. Each of the foregoing applications is incorporated herein by reference in its entirety.

BACKGROUND OF THE INVENTION

DE 3 701 880 C1 describes a method for controlling the optimum operating speeds of a processing machine. In the control method described, sensors are used to determine down times of a processing machine and the quantity of goods processed in the machine, and the processing speed of the processing machine is adjusted as a function of the store occupancy of the processing goods on the basis of different control functions, either on the basis of a control function which describes an optimum-output processing speed of the processing machine, on the basis of a control function which describes a cost-optimum processing speed of the machine, or on the basis of a control function which describes a productivity-optimum processing speed of the processing machine.

As an alternative to the control of a single processing machine, preferably a wrapping machine for hard caramels according to DE 3 701 880 C1, the method described in DE 3 701 880 C1 can also be applied to processing machines which are coupled to one another in parallel.

Furthermore, T. Rädler, Modellierung und Simulation von Abfüllinien, Fortschrittsbericht [Modelling and Simulation of filling lines, Progress Report] VDI Series 14, No. 93, VDI-Verlag, ISBN: 3-18-309314-6, page 57 (1999) describes the optimum control of filling machines with different processing speeds on the basis of a so-called speed V diagram, also referred to as a speed V profile.

In addition, the Institut fuer Konstruktionstechnik und Anlagengestaltung (Dresden, Germany) produces a commercially available processing machine simulation program. This simulation program, which is called PacSi, is used to simulate a process line having a plurality of processing machines which are coupled to one another in series. The simulation input parameters are, for example, the mean time between two failures (Mean Time Between Failure (MTBF)) and the mean time between the occurrence of a fault and its rectification (Mean Time To Repair (MTTR)) as well as the respective processing speeds at which the respective machine is operated.

In addition, Dualis GmbH IT Solution (Dresden, Germany) produces a software optimization program, which is likewise commercially available and is called ISSOP. This optimization program provides different optimization methods, for example empirically based, gradient-based and model-based optimization methods, which can be used for process optimization purposes.

The invention is based on the problem of providing improved process optimization for a machine installation having a plurality of machines which are coupled to one another in series.

The problem is solved by a method for computer-aided control of a plurality of machines which are coupled to one another in series, by means of a control device and by means of a machine arrangement.

SUMMARY OF THE INVENTION

In a method for computer-aided control of a plurality of machines which are coupled to one another in series, in other words a plurality of interlinked machines in a row, machine sensor values are recorded, for example the processing speed of the machines or the number of items which are fed into the respective machine, that is to say those which are supplied to it or are emitted from the machine, that is to say are carried away from it.

The machines are preferably in the form of processing machines, in particular packaging machines, whose processing and/or packaging characteristic is controlled by means of the method.

Using at least some of the recorded machine sensor values, the machines are controlled in order to stabilize their processes on the basis of a machine control matrix which is selected from a plurality of machine control matrices, with nominal control values for the controlled machine being stored in each machine control matrix. Furthermore, process optimization is carried out on the basis of a predeterminable criterion using at least some of the recorded machine sensor values, by which means a machine control matrix which is optimum on the basis of the process optimization is determined from the plurality of machine control matrices, and is then used to control the machines.

The process optimization can be carried out as often as desired, preferably on the basis of a predeterminable time criterion, that is to say preferably periodically at a predeterminable repetition interval. An optimum selected machine control matrix is thus always used for the predetermined repetition interval and, once the process optimization has been carried out, a different machine control matrix can in each case be used for process stabilization purposes.

A control device for controlling a plurality of machines which are coupled to one another in series has a recording device for recording machine sensor values, in which case the recording device can preferably have any desired number of sensors, for example light barriers with counters connected to them, in order to record the respective state of the machine. Furthermore, the control device has a control unit for controlling the machines in order to stabilize their processes on the basis of a machine control matrix which is selected from a plurality of machine control matrices, with nominal control values for the controlled machines being stored in each machine control matrix, and with the control unit using at least some of the recorded machine sensor values. In addition, a process optimization unit is provided for carrying out a process optimization on the basis of a predeterminable criterion using at least some of the recorded machine sensor values. A machine control matrix selection unit, which is likewise provided in the control device, determines and selects an optimum machine control matrix from the plurality of machine control matrices on the basis of the process optimization, with the specific and selected optimum machine control matrix then being used for the machine purposes.

A machine arrangement according to the invention has a plurality of machines which are coupled to one another in series, as well as a control device, which is coupled to the machines, in order to control the machines.

The invention can clearly be seen in that a two-stage, hierarchical optimization process is provided for closed-loop or open-loop control of machines which are interlinked in a row, with process stabilization being carried out in a first stage and process optimization being carried out in a second stage, with that machine control matrix which is in each case used in the course of the process stabilization, for example a matrix in which the respective nominal operating speeds of the machines are indicated, being determined and selected in the course of the process optimization.

The invention controls a series line of machines, whose process behavior is intrinsically very unstable and complex, in a process line in a simple, convenient and robust manner.

Preferred developments of the invention are specified in the dependent claims.

The refinements of the invention which are described in the following text relate not only to the method and the control device but also to the machine arrangement.

One development of the invention provides that nominal speed values at which the respective machines are intended to be operated are quoted in the machine control matrix. In other words, the process stabilization is based on a matrix in which the nominal operating speeds of the controlled machines are indicated.

It has been found that the operating speeds of the machines are a highly suitable controlled variable which can be influenced in a simple manner and which thus allows simple control.

According to one refinement of the invention, the speed values in the machine control matrix are allocated to the machines in accordance with a speed V profile, preferably in a corresponding manner to that described, for example, for a filling device in T. Rädler, Modellierung und Simulation von Abfüllinien, Fortschrittsbericht [Modelling and Simulation of filling lines, Progress Report] VDI Series 14, No. 93, VDI-Verlag, ISBN: 3-18-309314-6, page 57 (1999).

It has been found that the speed V profile is very highly suitable for controlling machines which are interlinked in a row for process stabilization purposes.

The nominal control values of the selected machine control matrix can be varied for control purposes, with the control process being carried out at the process stabilization level on the basis of the amended nominal control values. This allows intervention in the process stabilization at a lower control level, directly and in real time, according to the invention.

Another refinement of the invention provides for a computer-aided simulation to be carried out, preferably using a computer simulation program, of the plurality of machines which are interlinked in a row, with a simulation model of the machines being used in the course of the computer-aided technical simulation.

This refinement of the invention provides for the process optimization to be carried on the basis of the result of the computer-aided simulation.

According to the invention, the PacSi program described above can be used as the simulation program. The coupling of the simulation and the optimization to one another according to the invention for the purposes of 1 two-stage control of machines which are interlinked in a row allows the machines to be controlled quickly and nevertheless very robustly and realistically. The process optimization is preferably carried out on the basis of maximization of the output of the individual machines, for example by using the effective output as a controlled variable for control purposes.

Another refinement of the invention provides for at least some of the machines to be in the form of one of the following machines:
bottle erector machine
material filling machine
cap sorting machine
cap aligner machine
bottle closure machine
bottle shoe lifter machine
bottle labeling machine,
coding machine
sticker machine
sheet shrinkage machine
multiple pack aligner machine,
carton packaging machine
carton closure machine
carton label printing machine
checking balance
palletization machine.

This means that the invention can preferably be used in the field of process line control for a packaging process line and/or a material filling process line.

As stated above, the process optimization can be carried out repeatedly as a function of a repetition criterion, for example repeatedly on the basis of a predeterminable repetition period.

The process optimization is preferably carried out on the basis of one of the following optimization methods:
an iterative optimization method,
a gradient-based optimization method,
a model-based optimization method.

The optimization can be carried out using an explicit description of the processes by means of mathematical functions, for example by means of differential equation systems, statistics etc., with fixed limits as well as quantitative transfer functions being predetermined in the course of the process description.

As an alternative to deterministic description of the process, a fuzzy description of a process can be used for process optimization purposes, for example using fuzzy logic with linguistic variables without fixed process limits and with qualitative transfer functions.

Alternatively, any type of stochastic estimator, for example a neural network can be used for process optimization, for model-based process optimization purposes.

One exemplary embodiment of the invention is illustrated in the figures and will be explained in more detail in the following text.

Although the exemplary embodiment is used as the basis for describing a process line for filling bottles with hair shampoo, it should be noted that the invention can be applied to any type of machines which are interlinked in a row, in particular to processing machines which are interlinked in a row and preferably to packaging machines which are interlinked in a row, in which items which are supplied successively to each individual machine can be processed in the respective machine on the basis of the machine characteristic, can be emitted from the machine and can be supplied from this machine once again as the input processing items in each case to a subsequent machine in the processing sequence.

DESCRIPTION OF DRAWINGS

In the figures.

DESCRIPTION OF THE PREFERRED EMBODIMENT

Figure 1A:
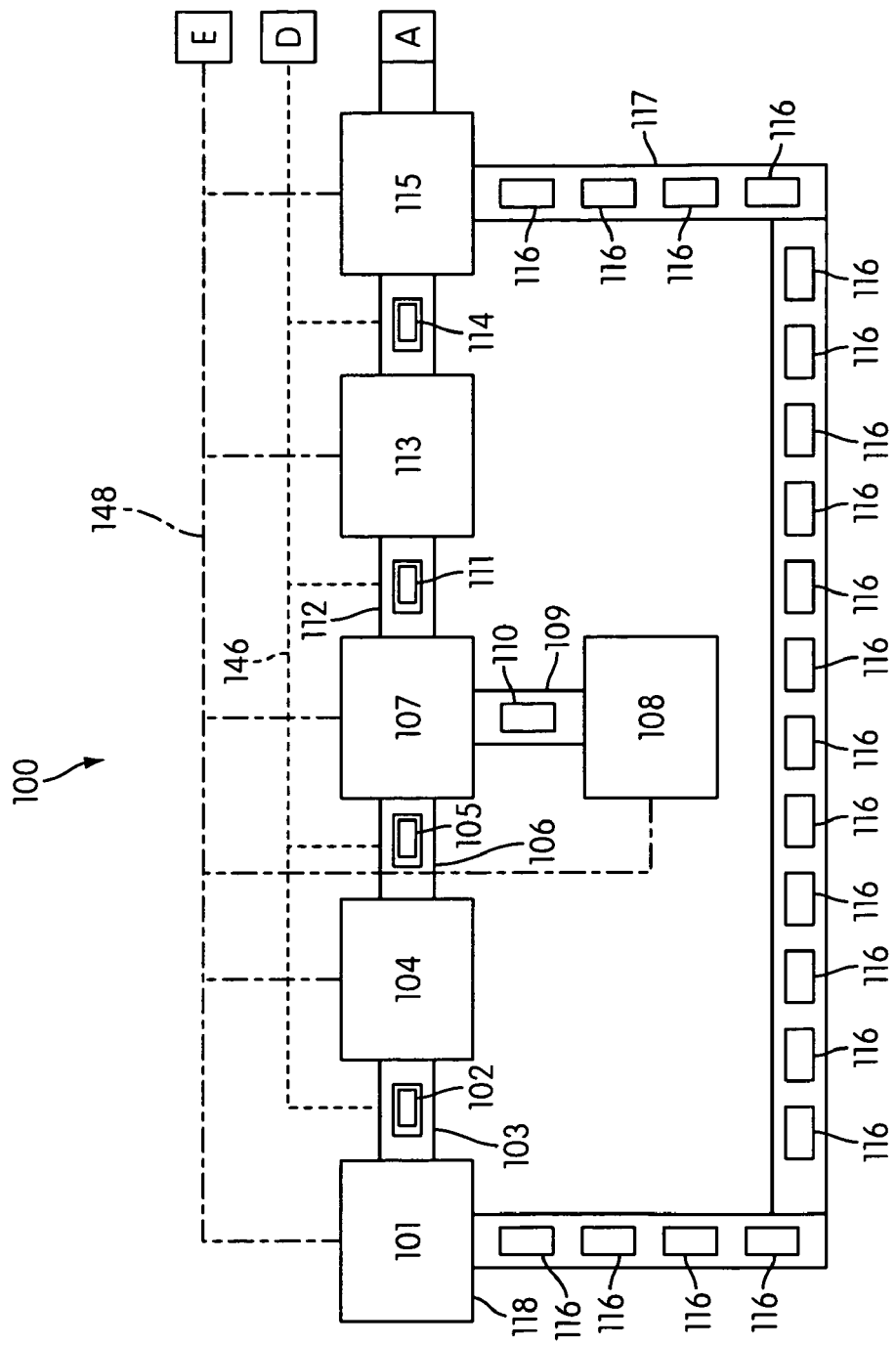
FIGS. 1a to 1c show a machine arrangement according to one exemplary embodiment of the invention.
Figure 1B:
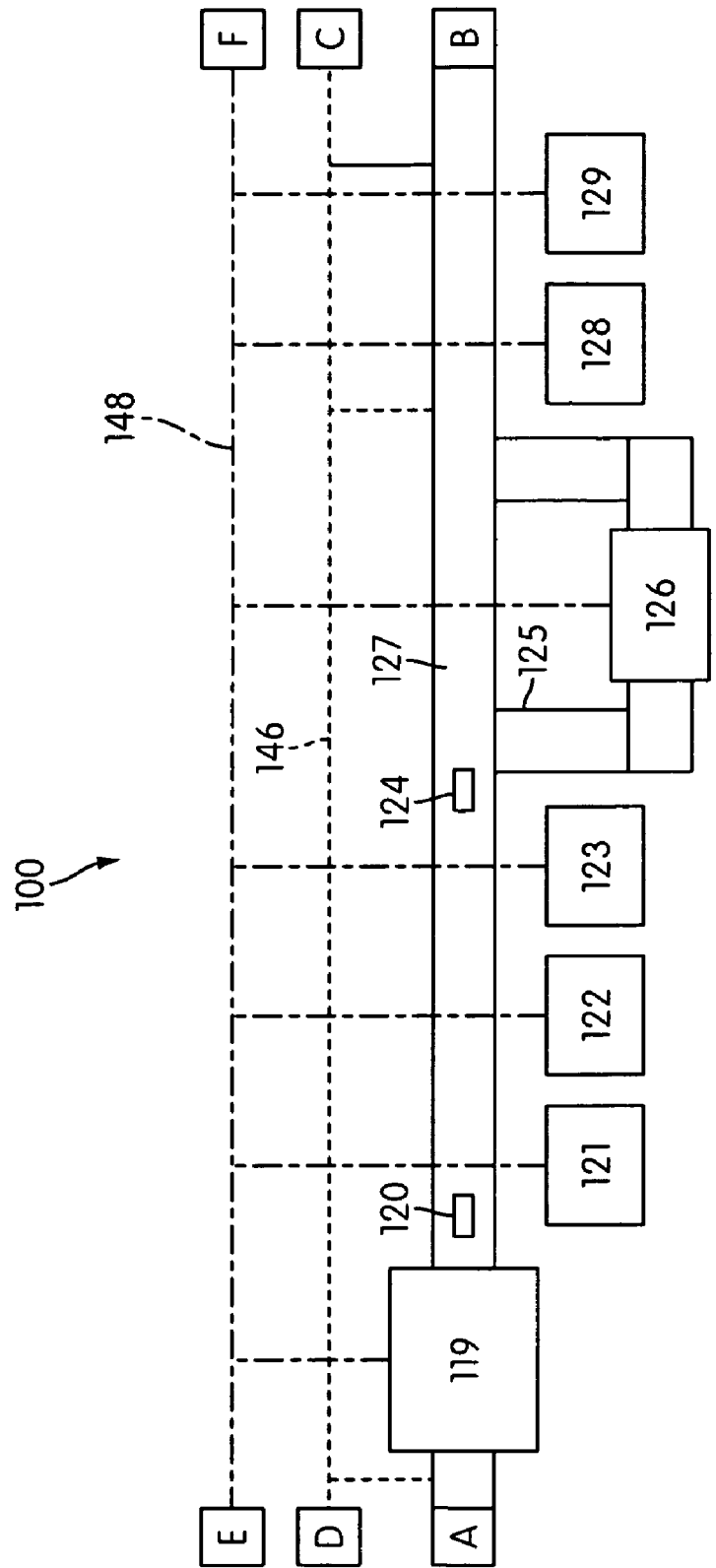
Figure 1C:
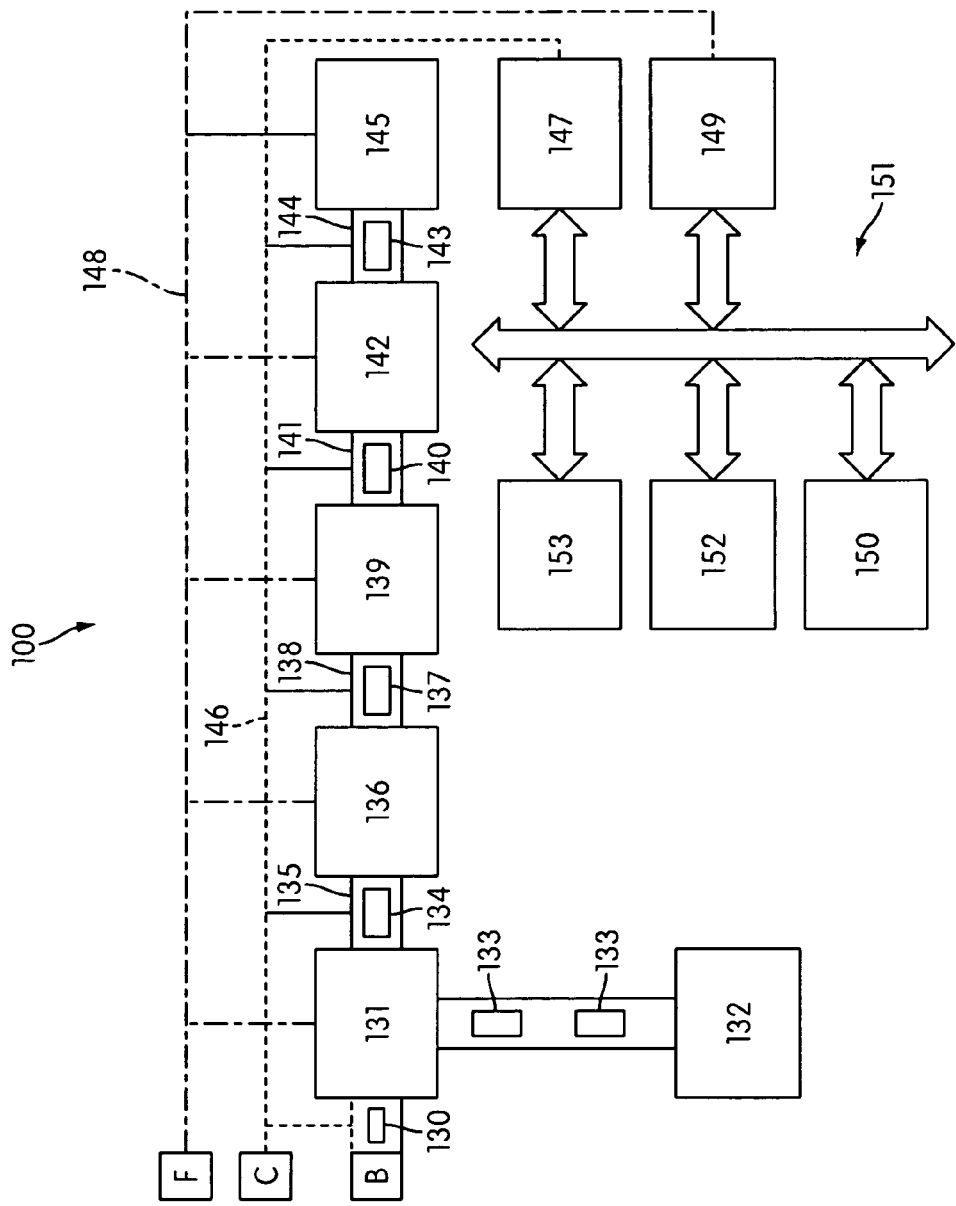

The machine arrangement 100 has a bottle erector machine 101, which is designed such that empty bottles 102 which are supplied to the bottle erector machine 101 are placed in bottle shoes 116, which will be described in more detail in the following text, in order in this way to ensure that the life of the bottles 102 is increased.

Once the bottles have been placed in the bottle shoes 116, the bottles 102 are supplied to a filler machine 104 by means of a conveyor belt 103. In general, the filling machine 104 is used to fill a container with a product with which it is in each case intended to be filled, with the bottle 102 that is supplied to the filling machine 104 in the case of this exemplary embodiment being filled with the desired liquid, specifically hair shampoo.

The bottle 105 filled with the liquid is transported by means of a further conveyor belt 106 from the filling machine 104 to a cap aligner machine 107, and is supplied to this machine. Closure caps 110 are supplied via a secondary input in a secondary flow for the cap aligner machine 107 from a cap sorting machine 108 via a further conveyor belt 109, and are applied to the filled bottles 105 by the cap aligner.

The bottles 111 with the lids fitted are supplied via a further conveyor belt 112 to a bottle closure machine 113, which completely closes the bottles 111 with the caps 110, so that the hair shampoo can no longer flow out of the bottle 111.

The bottles 114 which have been closed with the caps 110 are supplied to a bottle shoe removal machine 115, in which the bottles 114 which have been filled and have been closed with the caps are lifted out of the bottle shoes 116. The bottle shoes 116, which are now empty, are supplied once again via a further conveyor belt 117 to a secondary flow input 118 of the bottle erector machine 101.

The bottles 114 are then supplied by means of an additional conveyor belt 118 to a labeling machine 119, which applies predeterminable labels to the bottles 114.

Additional predeterminable codes are applied, for example by means of an ink jet system, to the labeled bottles 120 by means of a coding machine 121. Additional information is adhesively attached to the bottles by means of two sticker machines 122, 123.

For the rest of the production procedure, a distinction is drawn between two situations, on the one hand single-bottle packaging and on the other hand multiple bottle packaging, that is to say a predeterminable number of bottles are combined and are jointly welded in a sheet. According to this exemplary embodiment, it is possible for any desired predeterminable number of bottles, preferably five bottles, to be jointly welded in a sheet. If this is desired, then the labeled bottles 124, which have been marked with additional identification, are supplied via a secondary conveyor belt 125 to a group-of-five sheet shrinker machine 126, in which five bottles are in each case packaged jointly in one sheet and are welded, and the sheet is thus shrunk. If the bottles 124 are still intended to be packaged individually, then the labeled bottles 124 which have been marked with additional information are passed on via the main conveyor belt 127, bypassing the sheet shrinker machine 126.

In a further production path, two additional sticker machines 128, 129 are then provided, by means of which additional information can be applied to the sheets in which the bottles are packaged.

The bottles 130, which are completely marked in this way, are supplied to a carton packaging machine 131, by means of which the bottles 130 are packaged in cartons 133 which are supplied to the carton packaging machine 131 via a secondary input. The cartons 133 are erected by means of a multiple package erector machine 132, and are supplied, folded in a predetermined manner, to the secondary input of the carton packaging machine 131.

The cartons 134 which have been filled with the bottles are supplied via a further conveyor belt 135 to a carton closure machine 136, in which the cartons 134 are closed.

The closed cartons 137 are transported, once again by means of a conveyor belt 138, from the carton closure machine 136 to a carton label printing machine 139, in which predeterminable labels are printed on the cartons 137. The cartons 140 which have been provided with labels are supplied, once again by means of a conveyor belt 141, to a check weighing facility 142, which determines the correct weight of the respectively filled and closed cartons 137, in order to check whether the cartons 137 have actually been completely filled. If the cartons have not been completely filled, then the incorrectly filled cartons are rejected, and the bottles are used to fill new cartons. The correctly filled cartons 143 are supplied from the check weighing facility 142 by means of a further conveyor belt 144 to a palletization machine 145, which stacks the cartons 143 on pallets, and then delivers them.

Sensors, for example light barriers, are provided both at the main flow inputs of the individual machines and at the secondary flow inputs of the machines, by which, for example, caps or cartons are supplied to the respective machine, in general for processing of the supplied material which is actually used for the items to be processed, and at the outputs of the machines and at any desired predeterminable positions on a conveyor belt, in order to determine elements, for example a bottle, passing through a light barrier and, for example, to count these events by means of counters which are likewise provided and are coupled to the light barriers.

The conveyor belts are coupled by means of a first fieldbus 146, in this exemplary embodiment a Profibus, to a belt control unit 147, in this exemplary embodiment a programmable logic controller (PLC).

The machines are connected to a process stabilization control computer 149 by means of a second fieldbus, in this exemplary embodiment likewise a Profibus 148.

Control variables by means of which the speed of the individual conveyor belts is set are supplied to the individual conveyor belt by means of the belt control unit 147. Control variables are supplied by means of the process stabilization control computer 149 to the individual machines and to the programmable logic controllers which are preferably provided in the machines, by means of the second fieldbus 148, with the control variables in this exemplary embodiment being nominal speed values, by means of which the respective nominal operating speed of the machine is set, using the programmable logic controller for the respective machine.

In an alternative embodiment, in the situation where some of the machines are not fieldbus compatible, predeterminable signals are recorded by means of separate remote input/output interfaces (not illustrated), and corresponding control variables are supplied to the respective machine in accordance with the respective proprietary data format which is supported by the respective machine.

Furthermore, the data recorded by the sensors is supplied by means of the first fieldbus 146 and/or the second fieldbus 148 to a measurement data recording computer 150, which is coupled to the belt control unit 147 and to the process stabilization control computer 149 via a local communication network 151, in this exemplary embodiment the Ethernet, and is stored by this process stabilization control computer 149 in a measurement data database. The measurement data database is managed by a database computer 150. An additional process optimization computer 152 is likewise coupled to the abovementioned computers 147, 149, 150 by means of the Ethernet 151. The process optimization computer 152 carries out the process optimization processes described in the following text.

A simulation program, in this exemplary embodiment the technical computer simulation program PacSi, is stored in a simulation computer 153. The simulation computer 153 is likewise coupled to the Ethernet 151 and, via it, to the computers 147, 149, 150, 152 mentioned above, so that data can be interchanged between the individual computers 147, 149, 150, 152.

In other words, this means that, according to the invention, the process stabilization control computer 149 controls the machines as described in the following text on the basis of the respectively selected speed V profile. In other words, this means that the control process is carried out at the first hierarchical level, that is to say at the lower hierarchical level.

As will be explained in more detail in the following text, the process optimization computer 152 uses the results of the technical simulation (which is in each case carried out by the simulation computer 153) of the process line with the large number of machines to carry out process optimization with the maximum effective output (productivity) of the process line in production items as the optimization criterion.

In an alternative embodiment, the computers 149, 150, 152 and 153 are partially or completely combined in a hardware unit, preferably in a personal computer.

Each machine in the production path is preceded on the input side by a store of any desired size (not shown), in which the production item to be processed is inserted, and from which the machine takes the production item. The store allows the process line to be controlled more robustly and with fewer fluctuations since a defect or jam which is limited to a short time at a previous or subsequent machine has no effect on the machine itself.

In this context, it should be noted that, in an alternative embodiment, a plurality of the machines described above can be integrated in one machine. For example, the cap sorting machine 108 and the cap erector machine 107 may be integrated in one machine.

Figure 2:
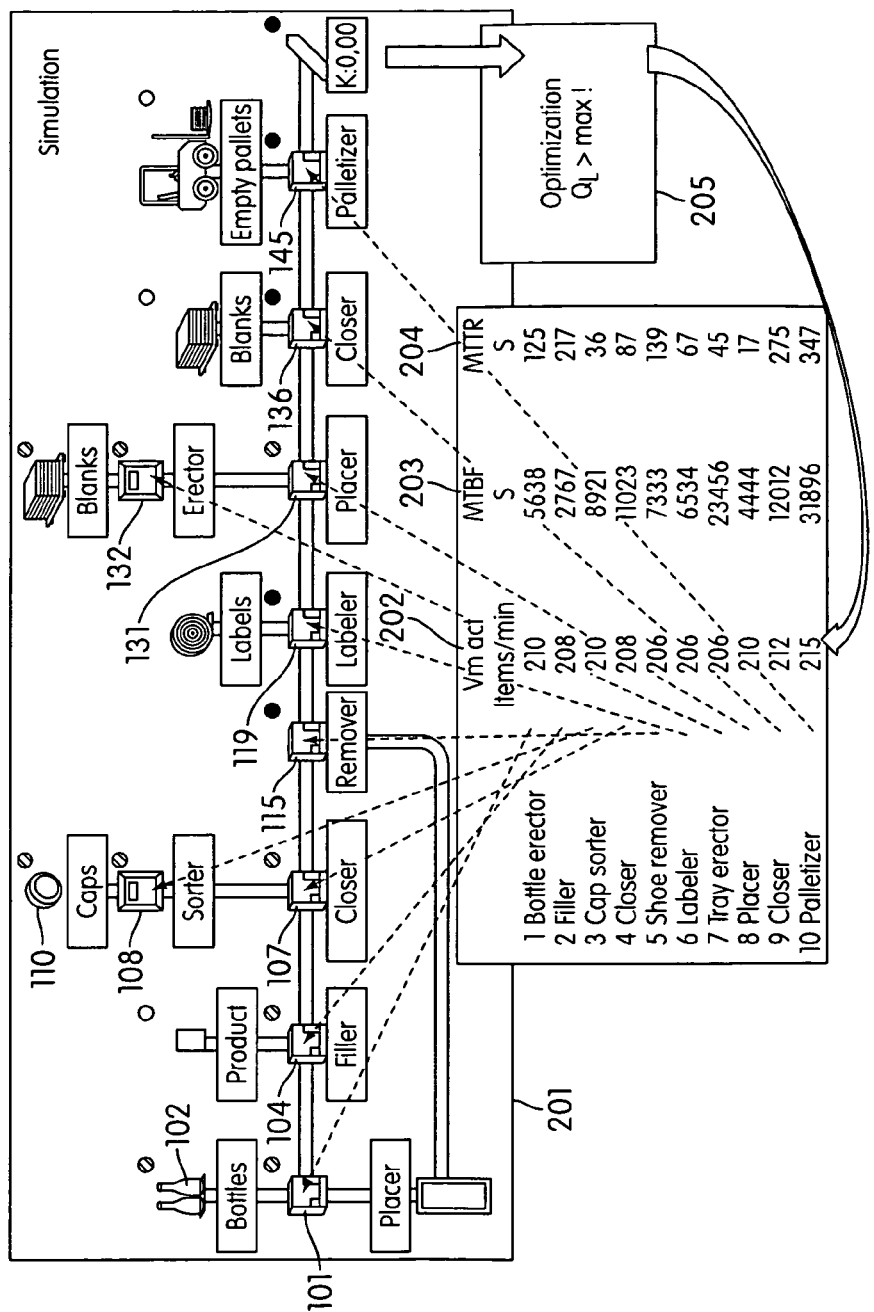
FIG. 2 shows an illustration of a screen surface of a computer simulation program, with the results of the simulation being used for process optimization purposes in order to control the machines in the machine arrangement, according to the exemplary embodiment of the invention.

FIG. 2 shows a screen surface 201 of the PacSi simulation program, which is carried out by the simulation computer 153, in order to illustrate the coupling according to the invention of a technical simulation of the machines in the machine arrangement and the process optimization. The respective large number of machines and their coupling to one another, preferably by means of conveyor belts, and the respective material flows are entered in the simulation program.

The operating speeds 202, the mean time between two failures of the machine 203 and the mean failure rates 204 as well as the associated distribution functions are also entered for each of the machines.

During a simulation relating to the respectively entered variables for different fault states, which are in each case set manually or automatically in the simulation, for example a failure of one or more of the machines in the process line or a lack or excess of production items in the material flow, the simulation program determines the optimization functions of the effective output, as is described per se for a single machine in [1].

The result of the simulation is thus, for example, the simulated actual speed of the respective machine, the actual productivity of the machine or of the entire process line and, depending on the process optimization strategy that is used, the nominal productivity of the machines in the process line of the individual machines running at the actual speed mentioned above, or the complete characteristic, that is to say a complete model description of the nominal productivity as a function of the nominal speeds.

These results which are produced by the simulation program are supplied via the Ethernet 151 to the process optimization computer 152, where they are processed using the respective process optimization process, in the form of a process optimization computer program 205, in this exemplary embodiment the ISSOP optimization program.

Process optimization is carried out by means of the process optimization program using the respectively desired process optimization strategy, as will be explained in more detail in the following text. One result of the process optimization that is carried out is a selected optimum machine control matrix, in which the respective optimum operating speeds (in terms of the effective output) are stored in the previously defined speed V profiles.

The optimum operating speeds (which are selected in this way using the optimum machine control matrix) of the individual machines are supplied to the programmable logic controllers for the machines from the process stabilization control computer 149, and are thus supplied to the machines. The process stabilization control computer 149 receives details about the optimum speed V profile from the process optimization computer 152.

Figure 3:
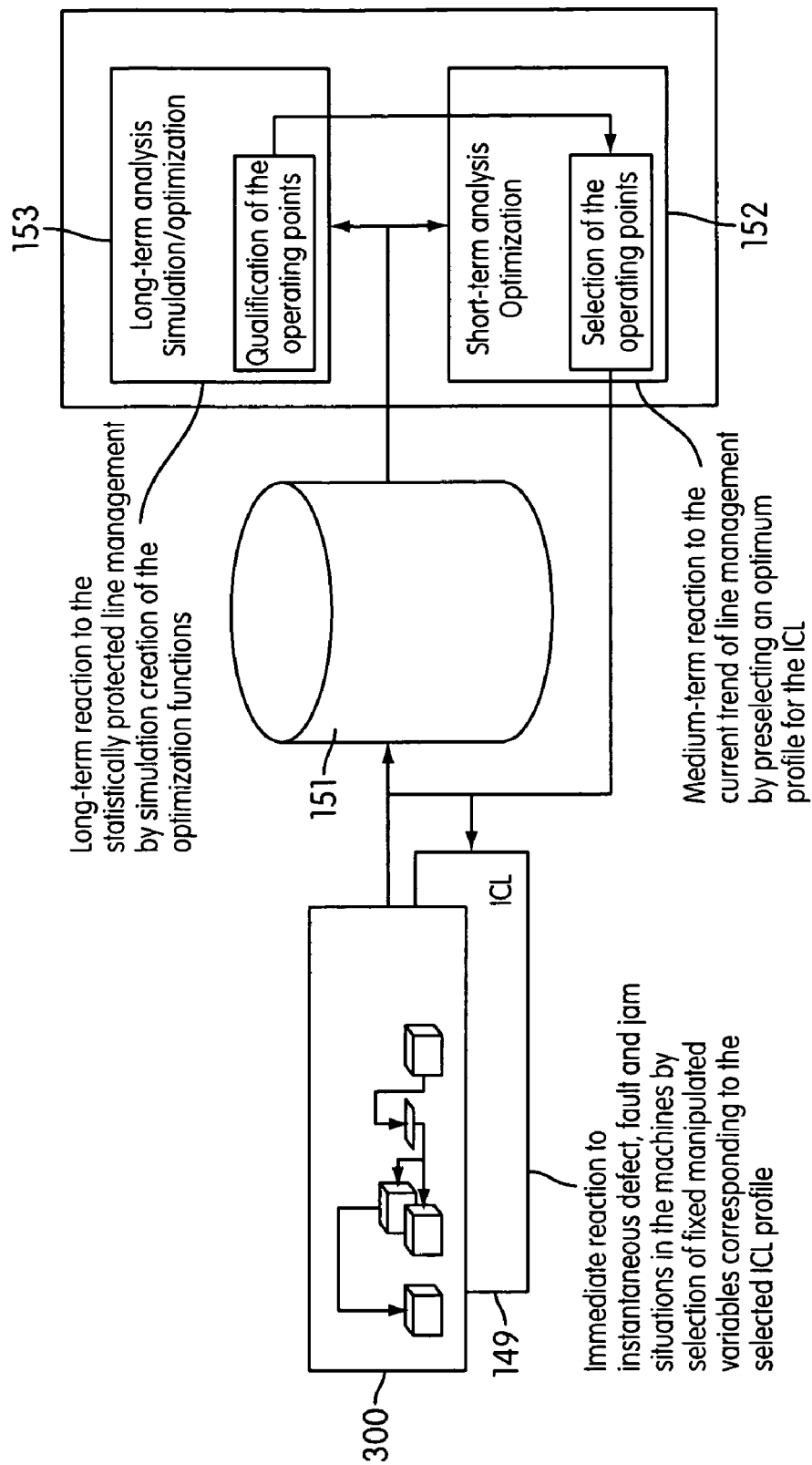
FIG. 3 shows a block diagram illustrating the principle of two-stage control according to the exemplary embodiment of the invention.

FIG. 3 uses a block diagram to show, schematically, the interaction between the machines, the process stabilization control computer 149, the process optimization computer 152 and the simulation computer 153.

The machines, which are identified jointly as a block 300 in FIG. 3, are monitored by means of the sensors that are provided in the process line for their actual speeds as well as their material flow, for example the number of bottles passing through a light barrier per unit time.

The machine sensor values which are recorded by means of the sensors are supplied via the first fieldbus 146 to the control computers 147 and/or 149 and, via them, to the measurement data database. Process stabilization is carried out by means of the process stabilization control computer 149 using the recorded actual speeds and the selected speed V profile, that is to say the individual machines are controlled, with conventional control algorithms being used for process stabilization, in which case the speeds of the individual machines can be changed from the predetermined nominal speeds (which are stored in the machine on the basis of the selected machine control matrix) as a function of the rules which are described in the following text and can be combined in a speed matrix, and the programmable logic controllers for the machines can be driven using the changed speeds.

The process stabilization control computer 149 thus clearly allows a real-time reaction to instantaneous fault situations, shortage situations and jam situations in the individual machines by selection of fixed manipulated variables corresponding to the respectively optimum selected speed V profile.

Furthermore, the simulation computer 153 carries out simulations of the entire process line to be simulated with the large number of machines, optionally using the machine sensor values. The simulation computer 153 clearly carries out a technical simulation of the process line, allowing reaction well in advance to the statistically protected aligned performance of the process line by using the simulator to create optimization functions, as will be explained in more detail in the following text.

The process optimization computer 152 uses the determined optimization functions to carry out process optimization processes with the optimum optimization function from a large number of previously stored optimization functions being determined as the result of the process optimization and, via this, with the optimum operating speed V profile on the basis of the respective optimization function being determined, selected and transmitted to the process stabilization control computer 149. This clearly allows medium-notice reaction to the current trend in the process line performance by presetting an optimum speed profile for the process stabilization control computer 149.

According to this exemplary embodiment, the control process is carried out on the basis of the optimum, selected speed profile in a time period based on seconds, for example every five seconds. According to this exemplary embodiment, the process optimization is carried out on the basis of minutes, that is to say for example every 10 minutes. The complete simulation of the process line is carried out repeatedly with a repetition interval of several hours, according to this exemplary embodiment eight hours.

Figure 4:
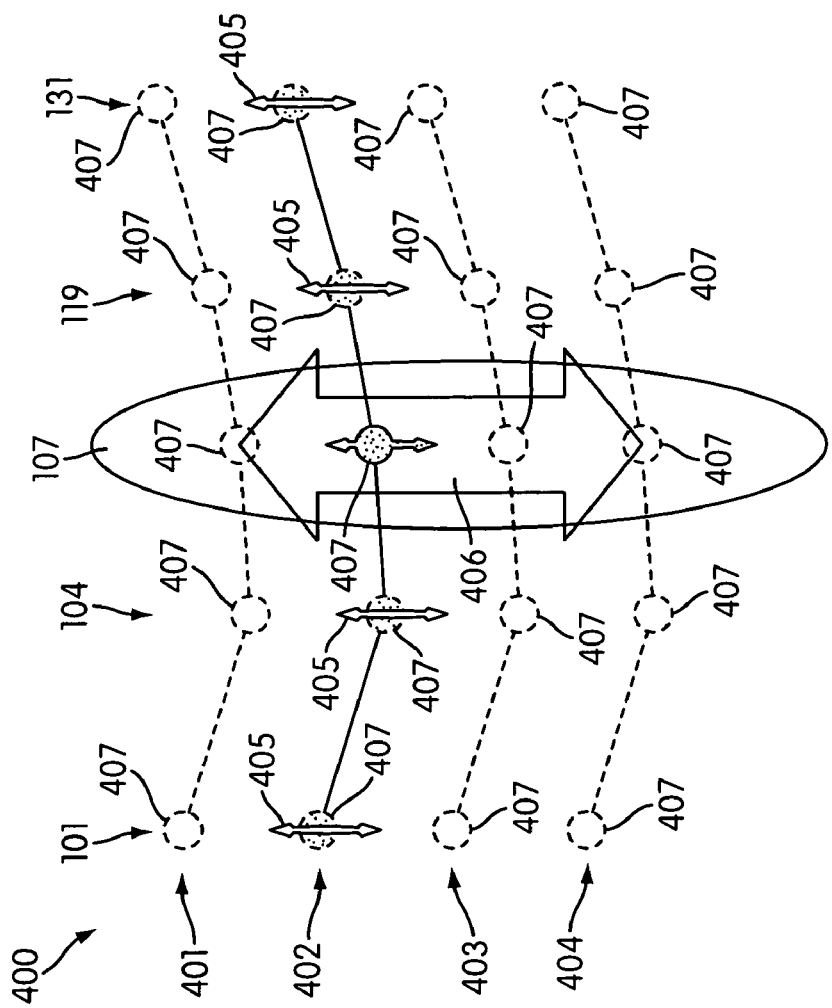
FIG. 4 shows a diagram illustrating speed V profiles according to the exemplary embodiment of the invention.

FIG. 4 uses a diagram 400 to show a plurality of machine control matrices, with the nominal operating speed 407 of each machine in the process line being stored in each machine control matrix 401, 402, 403, 404.

The nominal operating speeds 407 in each operating speed profile 401, 402, 403, 404 are preset according to this exemplary embodiment of the invention on the basis of the operating speed V profile, as described in [2].

By way of example, FIG. 4 shows five machines 101, 104, 107, 119, 131 in order to simplify the illustration, for each machine control matrix which, in this exemplary embodiment, represents just one vector in whose components the respective nominal operating speed for each machine is entered.

According to the invention, m operating speed V profiles 401, 402, 403, 404 are provided, where m is any desired number.

As is illustrated symbolically in FIG. 4, local adaptation of the operating speeds 407 is carried out within a selected speed V profile, the second speed V profile 402 by way of example in FIG. 4, that is to say local control of the nominal operating speeds 407 for process stabilization, as is in each case indicated by a vertical arrow 405.

As can be seen from FIG. 4, the speeds 407 of the respective speed profile V profiles 401, 402, 403, 404 differ, so that it is either possible to speed up or to slow down all of the machines in the process line, overall, by varying the selected operating speed V profiles.

In this context, it should be noted that the local control within a speed profile 401, 402, 403, 404 means that overlapping of the actual nominal speed 407 within a selected speed V profile can occur with a nominal speed 407 of an adjacent speed V profile.

As described above, the fundamental principle is to provide any desired number of stored and selectable speed V profiles.

20 speed V profiles are preferably provided, with one speed V profile 401, 402, 403, 404 in each case being provided at an interval of in each case five percent from the maximum operating speed of the machines.

In an alternative embodiment, the speed V profiles are located in a region within +or −20% of the respective nominal operating point.

As is likewise illustrated in FIG. 4, the respectively used speed V profile 401, 402, 403, 404 is "shifted" by the process optimization computer 152 by reselection of the process optimization carried out. On the basis of the process optimization, it is possible to select the immediately adjacent speed V profile to a selected speed V profile. Alternatively, any desired speed V profile can be selected on the basis of the result of the respective process optimization.

A double-headed arrow 406 in FIG. 4 illustrates the process optimization and the respective redefinition and reselection of the instantaneously optimum speed V profile associated with this.

The states of a respective machine, in particular the disturbance determined in the respective machine, which are considered in the course of the exemplary embodiment according to the invention, are explained briefly in the following text:

1. Disturbance in a Machine:

In the case of this event, a machine has completely or partially failed, and is thus subject to a disturbance.

2. Main Flow Jam:

In the case of this event, the machine sensor values are used to determine that there are an excessive number of the production items at the output of the respective machine, so that no further products can be emitted. The threshold value which leads to an event such as this, that is to say the number of production items which is greater than the number of products which can be accommodated in the main flow downstream from the machine leading to the fault message can be predetermined freely on a machine-specific basis.

3. Initial Alarm, Main Flow Jam:

In the case of this event, it is likewise possible to predetermine freely on a machine-specific basis an intermediate threshold value such that, if this intermediate threshold value is exceeded, it is assumed that a jam will occur in the main flow if the rate at which the production items are emitted from the machine is not reduced and/or the supply rate to the downstream machine is not increased.

4. Jam, Secondary Flow:

In the case of this event, a jam is determined via a secondary output from the machine in the material which is emitted from the machine which has a second or further material output as a result of the processing of the actual production item, for example empty bottle shoes being carried away in the exemplary embodiment according to the invention.

5. Shortage in the Main Flow:

In the case of this event, the process determines whether the machine is being supplied with too few production items, so that the machine can no longer operate correctly at its full load level. This event can be initiated if no production items are supplied to an input of the main flow of the machine for a predetermined time period.

6. Shortage in the Secondary Flow:

In the case of this event, the process determines whether the machine is being supplied with too little secondary flow material via one of the secondary inputs, so that the machine can no longer operate correctly at its full load level. This event can be initiated if no secondary flow material is supplied to an input of a secondary flow to the machine for a predetermined time.

7. Initial Alarm, Shortage of Main Flow:

In the case of this event, it is likewise possible to predetermine freely on a machine-specific basis an intermediate threshold value such that, if this intermediate threshold value is exceeded, it is assumed that there will be a shortage in the main flow if the supply rate of the production items to the machine is not increased.

The speed matrix for the individual machines in the machine arrangement 100 in the course of the process stabilization will be described in the following text as a function of the disturbances recorded for the respective machine:

The operating speed of the bottle erector machine 101 is changed in the following manner when the following events occur:

1. Disturbance, bottle erector machine 101:
   Bottle erector machine 101 is stopped;
2. Jam, main flow, bottle erector machine 101:
   Bottle erector machine 101 is stopped;
3. Initial alarm, jam, main flow, bottle erector machine 101:
   The bottle erector machine 101 is slowed down;
4. Jam, secondary flow, bottle erector machine 101:
   No speed change;
5. Shortage of main flow, bottle erector machine 101:
   Bottle erector machine 101 is stopped;
6. Shortage, secondary flow, bottle erector machine 101:
   Bottle erector machine 101 is stopped;
7. Initial alarm, shortage of main flow, bottle erector machine 101:
   No speed change;

The operating speed of the filling machine 104 is changed in the following manner when the following events occur in the bottle erector machine 101:

1. Disturbance, bottle erector machine 101:
   Same speed as the bottle closure machine 113;
2. Jam, main flow, bottle erector machine 101;
   Same speed as the bottle closure machine 113;
3. Initial alarm, jam, main flow, bottle erector machine 101:
   Same speed as the bottle closure machine 113;
4. Jam, secondary flow, bottle erector machine 101:
   No speed change;
5. Lack of main flow, bottle erector machine 101:
   Same speed as the bottle closure machine 113;
6. Lack of secondary flow, bottle erector machine 101:
   Same speed as the bottle closure machine 113;
7. Initial alarm, shortage of main flow, bottle erector machine 101:
   No speed change.

The operating speed of the cap sorting machine 108 is adapted in the following manner when the above events occur in the bottle erector machine 101:

1. Disturbance, bottle erector machine 101:
   Slow down the cap sorting machine 108;
2. Jam, main flow, bottle erector machine 101;
   Speed up the cap sorting machine 108;
3. Initial alarm, jam, main flow, bottle erector machine 101:
   Speed up the cap sorting machine 108;
4. Jam, secondary flow, bottle erector machine 101:
   No speed change;
5. Lack of main flow, bottle erector machine 101:
   Slow down the cap sorting machine 108;
6. Lack of secondary flow, bottle erector machine 101:
   Slow down the cap sorting machine 108;
7. Initial alarm, shortage of main flow, bottle erector machine 101:
   No speed change.

The operating speed of the cap aligner machine 107 is changed in the following manner when the following events occur in the bottle erector machine 101:

1. Disturbance, bottle erector machine 101:
   Same speed as the cap sorting machine 108;
2. Jam, main flow, bottle erector machine 101;
   Same speed as the cap sorting machine 108;
3. Initial alarm, jam, main flow, bottle erector machine 101:
   Same speed as the cap sorting machine 108;
4. Jam, secondary flow, bottle erector machine 101:
   No speed change;
5. Lack of main flow, bottle erector machine 101:
   Same speed as the cap sorting machine 108;
6. Lack of secondary flow, bottle erector machine 101:
   Same speed as the cap sorting machine 108;
7. Initial alarm, shortage of main flow, bottle erector machine 101:
   No speed change.

The operating speed of the bottle closure machine 113 is changed in the following manner when the following events occur in the bottle erector machine 101:

1. Disturbance, bottle erector machine 101:
   Slow down the bottle closure machine 113;
2. Jam, main flow, bottle erector machine 101;
   Speed up the bottle closure machine 113;
3. Initial alarm, jam, main flow, bottle erector machine 101:
   Speed up the bottle closure machine 113;
4. Jam, secondary flow, bottle erector machine 101:
   No speed change;
5. Lack of main flow, bottle erector machine 101:
   Slow down the bottle closure machine 113;
6. Lack of secondary flow, bottle erector machine 101:
   Slow down the bottle closure machine 113;
7. Initial alarm, shortage of main flow, bottle erector machine 101:
   No speed change.

The bottle shoe removal machine 115 is changed in the following manner in accordance with the exemplary embodiment when the following events occur in the bottle erector machine 101:

1. Disturbance, bottle erector machine 101:
   Slow down the bottle shoe removal machine 115;
2. Jam, main flow, bottle erector machine 101;
   Speed up the bottle shoe removal machine 115;
3. Initial alarm, jam, main flow bottle erector machine 101:
   Speed up the bottle shoe removal machine 115;
4. Jam, secondary flow, bottle erector machine 101:
   No speed change;

5. Lack of main flow, bottle erector machine 101:
Slow down the bottle shoe removal machine 115;
6. Lack of secondary flow, bottle erector machine 101:
Slow down the bottle shoe removal machine 115;
7. Initial alarm, shortage of main flow, bottle erector machine 101:
No speed change.

The operating speed of the labeling machine 119 is changed in the following manner when the following events occur in the bottle erector machine 101:
1. Disturbance, bottle erector machine 101:
Same speed as the bottle shoe removal machine 115;
2. Jam, main flow, bottle erector machine 101;
Same speed as the bottle shoe removal machine 115;
3. Initial alarm, jam, main flow bottle erector machine 101:
Same speed as the bottle shoe removal machine 115;
4. Jam, secondary flow, bottle erector machine 101:
No speed change;
5. Lack of main flow, bottle erector machine 101:
Same speed as the bottle shoe removal machine 115;.
6. Lack of secondary flow, bottle erector machine 101:
Same speed as the bottle shoe removal machine 115;
7. Initial alarm, shortage of main flow, bottle erector machine 101:
No speed change.

There is no speed change to the coding machine 121, the first sticker machine 122 or the second sticker machine 123 when the above disturbances occur in the bottle erector machine 101.

The operating speed of the sheet shrinker machine 126 is changed in the following manner when the above events occur in the bottle erector machine 101:
1. Disturbance, bottle erector machine 101:
Slow down the sheet shrinking machine 126;
2. Jam, main flow, bottle erector machine 101;
Speed up the sheet shrinking machine 126;
3. Initial alarm, jam, main flow bottle erector machine 101:
Speed up the sheet shrinking machine 126;
4. Jam, secondary flow, bottle erector machine 101:
No speed change;
5. Lack of main flow, bottle erector machine 101:
Slow down the sheet shrinking machine 126;
6. Lack of secondary flow, bottle erector machine 101:
Slow down the sheet shrinking machine 126;
7. Initial alarm, shortage of main flow, bottle erector machine 101:
No speed change.

The operating speeds of the remaining machines 128, 129, 131, 132, 136, 139, 142 and 145 remain unchanged when the above events occur in the bottle erector machine 101.

The change in the operating speeds when the following events occur in the filling machine 104 will be explained in more detail in the following text.

The operating speed of the bottle erector machine 101 is changed in the following manner when the following events occur in the filling machine 104:
1. Disturbance in the filling machine 104;
Slow down the bottle erector machine 101;
2. Jam, main flow, filling machine 104:
Slow down the bottle erector machine 101;
3. Initial alarm, jam, main flow, filling machine 104:
No speed change;
4. Jam, secondary flow, filling machine 104:
No speed change;
5. Shortage in the main flow, filling machine 104:
Speed up the bottle erector machine 101;
6. Shortage in the secondary flow, filling machine 104:
Slow down the bottle erector machine 101;
7. Initial alarm, shortage in the main flow, filling machine 104:
No speed change.

The operating speed of the filling machine 104 is changed in the following manner when the following events occur in the filling machine 104:
1. Disturbance in the filling machine 104;
Filling machine 104 is stopped;
2. Jam, main flow, filling machine 104:
Filling machine 104 is stopped;
3. Initial alarm, jam, main flow, filling machine 104:
No speed change;
4. Jam, secondary flow, filling machine 104:
No speed change;
5. Shortage in the main flow, filling machine 104:
Filling machine 104 is stopped;
6. Shortage in the secondary flow, filling machine 104:
Filling machine 104 is stopped;
7. Initial alarm, shortage in the main flow, filling machine 104:
No speed change.

The operating speed of the cap sorting machine 108 is changed in the following manner when the following events occur in the filling machine 104:
1. Disturbance in the filling machine 104;
Slow down the cap sorting machine 108;
2. Jam, main flow, filling machine 104:
Speed up the cap sorting machine 108;
3. Initial alarm, jam, main flow, filling machine 104:
No speed change;
4. Jam, secondary flow, filling machine 104:
No speed change;
5. Shortage in the main flow, filling machine 104:
Slow down the cap sorting machine 108;
6. Shortage in the secondary flow, filling machine 104:
Slow down the cap sorting machine 108;
7. Initial alarm, shortage in the main flow, filling machine 104:
No speed change.

The operating speed of the cap aligner machine 107 is changed in the following manner when the following events occur in the filling machine 104:
1. Disturbance in the filling machine 104;
Same speed as the cap sorting machine 108;
2. Jam, main flow, filling machine 104:
Same speed as the cap sorting machine 108;
3. Initial alarm, jam, main flow, filling machine 104:
No speed change;
4. Jam, secondary flow, filling machine 104:
No speed change;
5. Shortage in the main flow, filling machine 104:
Same speed as the cap sorting machine 108;
6. Shortage in the secondary flow, filling machine 104:
Same speed as the cap sorting machine 108;
7. Initial alarm, shortage in the main flow, filling machine 104:
No speed change.

The operating speed of the bottle closure machine 113 is changed in the following manner when the following events occur in the filling machine 104:
1. Disturbance in the filling machine 104;
Slow down the bottle closure machine 113;
2. Jam, main flow, filling machine 104:
Speed up the bottle closure machine 113;

3. Initial alarm, jam, main flow, filling machine 104:
   No speed change;
4. Jam, secondary flow, filling machine 104:
   No speed change;
5. Shortage in the main flow, filling machine 104:
   Slow down the bottle closure machine 113;
6. Shortage in the secondary flow, filling machine 104:
   Slow down the bottle closure machine 113;
7. Initial alarm, shortage in the main flow, filling machine 104:
   No speed change.

The operating speed of the bottle shoe removal machine 115 is changed in the following manner when the following events occur in the filling machine 104:
1. Disturbance in the filling machine 104;
   Slow down the bottle shoe removal machine 115;
2. Jam, main flow, filling machine 104:
   Speed up the bottle shoe removal machine 115;
3. Initial alarm, jam, main flow, filling machine 104:
   No speed change;
4. Jam, secondary flow, filling machine 104:
   No speed change;
5. Shortage in the main flow, filling machine 104:
   Slow down the bottle shoe removal machine 115;
6. Shortage in the secondary flow, filling machine 104:
   Slow down the bottle shoe removal machine 115;
7. Initial alarm, shortage in the main flow, filling machine 104:
   No speed change.

The operating speed of the labeling machine 119 is changed in the following manner when the following events occur in the filling machine 104:
1. Disturbance in the filling machine 104;
   Same speed as the bottle shoe removal machine 115;
2. Jam, main flow, filling machine 104:
   Same speed as the bottle shoe removal machine 115;
3. Initial alarm, jam, main flow, filling machine 104:
   No speed change;
4. Jam, secondary flow, filling machine 104:
   No speed change;
5. Shortage in the main flow, filling machine 104:
   Same speed as the bottle shoe removal machine 115;
6. Shortage in the secondary flow, filling machine 104:
   Same speed as the bottle shoe removal machine 115;
7. Initial alarm, shortage in the main flow, filling machine 104:
   No speed change.

The operating speed of the coding machine 121 and of the first sticker machine 122 as well as the second sticker machine 123 remains unchanged when all of the above events occur in the filling machine 104.

The operating speed of the sheet shrinker machine 126 is changed in the following manner when the following events occur in the filling machine 104:
1. Disturbance in the filling machine 104;
   Slow down the sheet shrinker machine 126;
2. Jam, main flow, filling machine 104:
   Speed up the sheet shrinker machine 126;
3. Initial alarm, jam, main flow, filling machine 104:
   No speed change;
4. Jam, secondary flow, filling machine 104:
   No speed change;
5. Shortage in the main flow, filling machine 104:
   Slow down the sheet shrinker machine 126;
6. Shortage in the secondary flow, filling machine 104:
   Slow down the sheet shrinker machine 126;
7. Initial alarm, shortage in the main flow, filling machine 104:
   No speed change.

The operating speed of the other machines 128, 129, 131, 132, 136, 139, 142 and 145 remains unchanged when the above events occur in the filling machine 104.

The change to the operating speeds of the machines when the following events occur in the cap sorting machine 108 will be described in more detail in the following text.

The operating speed of the bottle erector machine 101 is changed in the following manner when the following events occur in the cap sorting machine 108:
1. Disturbance, cap sorting machine 108:
   Slow down the bottle erector machine 101;
2. Jam, main flow, cap sorting machine 108:
   Speed up the bottle erector machine 101;
3. Initial alarm, jam, main flow, cap sorting machine 108:
   Speed up the bottle erector machine 101;
4. Jam, secondary flow, cap sorting machine 108:
   No speed change;
5. Shortage of main flow, cap sorting machine 108:
   Slow down the bottle erector machine 101;
6. Shortage of secondary flow, cap sorting machine 108:
   No speed change;
7. Initial alarm, shortage of main flow, cap sorting machine 108:
   No speed change.

The operating speed of the filling machine 104 is changed in the following manner when the following events occur in the cap sorting machine 108:
1. Disturbance, cap sorting machine 108:
   Same speed as the bottle closure machine 113;
2. Jam, main flow, cap sorting machine 108:
   Same speed as the bottle closure machine 113;
3. Initial alarm, jam, main flow, cap sorting machine 108:
   Same speed as the bottle closure machine 113;
4. Jam, secondary flow, cap sorting machine 108:
   No speed change;
5. Shortage of main flow, cap sorting machine 108:
   Same speed as the bottle closure machine 113;
6. Shortage of secondary flow, cap sorting machine 108:
   No speed change;
7. Initial alarm, shortage of main flow, cap sorting machine 108:
   No speed change.

The operating speed of the cap sorting machine 108 is changed in the following manner when the following events occur in the cap sorting machine 108:
1. Disturbance, cap sorting machine 108:
   Cap sorting machine 108 is stopped;
2. Jam, main flow, cap sorting machine 108:
   Cap sorting machine 108 is stopped;
3. Initial alarm, jam, main flow, cap sorting machine 108:
   Slow down the cap sorting machine 108;
4. Jam, secondary flow, cap sorting machine 108:
   No speed change;
5. Shortage of main flow, cap sorting machine 108:
   Speed up the cap sorting machine 108;
6. Shortage of secondary flow, cap sorting machine 108:
   No speed change;
7. Initial alarm, shortage of main flow, cap sorting machine 108:
   No speed change.

The operating speed of the cap aligner machine 107 is changed in the following manner when the following events occur in the cap sorting machine 108:
1. Disturbance, cap sorting machine 108:
   Same speed as the cap sorting machine 108;
2. Jam, main flow, cap sorting machine 108:
   Same speed as the cap sorting machine 108;
3. Initial alarm, jam, main flow, cap sorting machine 108:
   Same speed as the cap sorting machine 108;
4. Jam, secondary flow, cap sorting machine 108:
   No speed change;
5. Shortage of main flow, cap sorting machine 108:
   Same speed as the cap sorting machine 108;
6. Shortage of secondary flow, cap sorting machine 108:
   No speed change;
7. Initial alarm, shortage of main flow, cap sorting machine 108:
   No speed change.

The operating speed of the bottle closure machine 113 is changed in the following manner when the following events occur in the cap sorting machine 108:
1. Disturbance, cap sorting machine 108:
   Slow down the bottle closure machine 113;
2. Jam, main flow, cap sorting machine 108:
   Speed up the bottle closure machine 113;
3. Initial alarm, jam, main flow, cap sorting machine 108:
   Speed up the bottle closure machine 113;
4. Jam, secondary flow, cap sorting machine 108:
   No speed change;
5. Shortage of main flow, cap sorting machine 108:
   Slow down the bottle closure machine 113;
6. Shortage of secondary flow, cap sorting machine 108:
   No speed change;
7. Initial alarm, shortage of main flow, cap sorting machine 108:
   No speed change.

The operating speed of the bottle shoe removal machine 115 is changed in the following manner when the following events occur in the cap sorting machine 108:
1. Disturbance, cap sorting machine 108:
   Slow down the bottle shoe removal machine 115;
2. Jam, main flow, cap sorting machine 108:
   Speed up the bottle shoe removal machine 115;
3. Initial alarm, jam, main flow, cap sorting machine 108:
   Speed up the bottle shoe removal machine 115;
4. Jam, secondary flow, cap sorting machine 108:
   No speed change;
5. Shortage of main flow, cap sorting machine 108:
   Slow down the bottle shoe removal machine 115;
6. Shortage of secondary flow, cap sorting machine 108:
   No speed change;
7. Initial alarm, shortage of main flow, cap sorting machine 108:
   No speed change.

The operating speed of the labeling machine 119 is changed in the following manner when the following events occur in the cap sorting machine 108:
1. Disturbance, cap sorting machine 108:
   Same speed as the bottle shoe removal machine 115;
2. Jam, main flow, cap sorting machine 108:
   Same speed as the bottle shoe removal machine 115;
3. Initial alarm, jam, main flow, cap sorting machine 108:
   Same speed as the bottle shoe removal machine 115;
4. Jam, secondary flow, cap sorting machine 108:
   No speed change;
5. Shortage of main flow, cap sorting machine 108:
   Same speed as the bottle shoe removal machine 115;
6. Shortage of secondary flow, cap sorting machine 108:
   No speed change;
7. Initial alarm, shortage of main flow, cap sorting machine 108:
   No speed change.

The operating speeds of the coding machine 121, of the first sticker machine 122 and of the second sticker machine 123 remain unchanged when the above events occur in the cap sorting machine 108.

The operating speed of the sheet shrinker machine 126 is changed in the following manner when the following events occur in the cap sorting machine 108:
1. Disturbance, cap sorting machine 108:
   Slow down the sheet shrinker machine 126;
2. Jam, main flow, cap sorting machine 108:
   Speed up the sheet shrinker machine 126;
3. Initial alarm, jam, main flow, cap sorting machine 108:
   Speed up the sheet shrinker machine 126;
4. Jam, secondary flow, cap sorting machine 108:
   No speed change;
5. Shortage of main flow, cap sorting machine 108:
   Slow down the sheet shrinker machine 126;
6. Shortage of secondary flow, cap sorting machine 108:
   No speed change;
7. Initial alarm, shortage of main flow, cap sorting machine 108:
   No speed change.

The operating speeds of the other machines 128, 129, 131, 132, 136, 139, 142 and 145 remain unchanged when the above events occur in the cap sorting machine 108.

The changes in the operating speeds of the machines in the process line when the following events occur in the cap aligner machine 107 will be explained in more detail in the following text.

The operating speed of the bottle erector machine 101 is changed in the following manner when the following events occur in the cap aligner machine 107:
1. Disturbance, cap aligner machine 107:
   Slow down the bottle erector machine 101;
2. Jam, main flow, cap aligner machine 107:
   No speed change;
3. Initial alarm, jam, main flow, cap aligner machine 107:
   No speed change;
4. Jam, secondary flow, cap aligner machine 107:
   No speed change;
5. Shortage of main flow, cap aligner machine 107:
   Slow down the bottle erector machine 101;
6. Shortage of secondary flow, cap aligner machine 107:
   No speed change;
7. Initial alarm, shortage of main flow, cap aligner machine 107:
   No speed change.

The operating speed of the filling machine 104 is changed in the following manner when the following events occur in the cap aligner machine 107:
1. Disturbance, cap aligner machine 107:
   Same speed as the bottle closure machine 113;
2. Jam, main flow, cap aligner machine 107:
   No speed change;
3. Initial alarm, jam, main flow, cap aligner machine 107:
   No speed change;
4. Jam, secondary flow, cap aligner machine 107:
   No speed change;
5. Shortage of main flow, cap aligner machine 107:
   Same speed as the bottle closure machine 113;
6. Shortage of secondary flow, cap aligner machine 107:
   No speed change;

7. Initial alarm, shortage of main flow, cap aligner machine 107:
   No speed change.

The operating speed of the cap sorting machine 108 is changed in the following manner when the following events occur in the cap aligner machine 107:
1. Disturbance, cap aligner machine 107:
   Slow down the cap sorting machine 108;
2. Jam, main flow, cap aligner machine 107:
   No speed change;
3. Initial alarm, jam, main flow, cap aligner machine 107:
   No speed change;
4. Jam, secondary flow, cap aligner machine 107:
   No speed change;
5. Shortage of main flow, cap aligner machine 107:
   Slow down the cap sorting machine 108;
6. Shortage of secondary flow, cap aligner machine 107:
   No speed change;
7. Initial alarm, shortage of main flow, cap aligner machine 107:
   No speed change.

The operating speed of the cap aligner machine 107 is changed in the following manner when the following events occur in the cap aligner machine 107:
1. Disturbance, cap aligner machine 107:
   Cap aligner machine 107 is stopped;
2. Jam, main flow, cap aligner machine 107:
   No speed change;
3. Initial alarm, jam, main flow, cap aligner machine 107:
   No speed change;
4. Jam, secondary flow, cap aligner machine 107:
   No speed change;
5. Shortage of main flow, cap aligner machine 107:
   Speed up the cap aligner machine 107;
6. Shortage of secondary flow, cap aligner machine 107:
   No speed change;
7. Initial alarm, shortage of main flow, cap aligner machine 107:
   No speed change.

The operating speed of the bottle closure machine 113 is changed in the following manner when the following events occur in the cap aligner machine 107:
1. Disturbance, cap aligner machine 107:
   Slow down the bottle closure machine 113;
2. Jam, main flow, cap aligner machine 107:
   No speed change;
3. Initial alarm, jam, main flow, cap aligner machine 107:
   No speed change;
4. Jam, secondary flow, cap aligner machine 107:
   No speed change;
5. Shortage of main flow, cap aligner machine 107:
   Slow down the bottle closure machine 113;
6. Shortage of secondary flow, cap aligner machine 107:
   No speed change;
7. Initial alarm, shortage of main flow, cap aligner machine 107:
   No speed change.

The operating speed of the bottle shoe removal machine 115 is changed in the following manner when the following events occur in the cap aligner machine 107:
1. Disturbance, cap aligner machine 107:
   Slow down the bottle shoe removal machine 115;
2. Jam, main flow, cap aligner machine 107:
   No speed change;
3. Initial alarm, jam, main flow, cap aligner machine 107:
   No speed change;
4. Jam, secondary flow, cap aligner machine 107:
   No speed change;
5. Shortage of main flow, cap aligner machine 107:
   Slow down the bottle shoe removal machine 115;
6. Shortage of secondary flow, cap aligner machine 107:
   No speed change;
7. Initial alarm, shortage of main flow, cap aligner machine 107:
   No speed change.

The operating speed of the labeling machine 119 is changed in the following manner when the following events occur in the cap aligner machine 107:
1. Disturbance, cap aligner machine 107:
   Same speed as the bottle shoe removal machine 115;
2. Jam, main flow, cap aligner machine 107:
   No speed change;
3. Initial alarm, jam, main flow, cap aligner machine 107:
   No speed change;
4. Jam, secondary flow, cap aligner machine 107:
   No speed change;
5. Shortage of main flow, cap aligner machine 107:
   Same speed as the bottle shoe removal machine 115;
6. Shortage of secondary flow, cap aligner machine 107:
   No speed change;
7. Initial alarm, shortage of main flow, cap aligner machine 107:
   No speed change.

The operating speeds of the coding machine 121, the first sticker machine 122 and the second sticker machine 123 remain unchanged when the above events occur in the cap aligner machine 107.

The operating speed of the sheet shrinker machine 126 is changed in the following manner when the following events occur in the cap aligner machine 107.
1. Disturbance, cap aligner machine 107:
   Slow down the sheet shrinker machine 126;
2. Jam, main flow, cap aligner machine 107:
   No speed change;
3. Initial alarm, jam, main flow, cap aligner machine 107:
   No speed change;
4. Jam, secondary flow, cap aligner machine 107:
   No speed change;
5. Shortage of main flow, cap aligner machine 107:
   Slow down the sheet shrinker machine 126;
6. Shortage of secondary flow, cap aligner machine 107:
   No speed change;
7. Initial alarm, shortage of main flow, cap aligner machine 107:
   No speed change.

The operating speeds of the other machines 128, 129, 131, 132, 136, 139, 142, 145 in the process line remain unchanged when the above events occur in the cap aligner machine 107.

Changes to the operating speeds of the machines when the following events occur in the bottle closure machine 113 will be explained in detail in the following text.

The operating speed of the bottle erector machine 101 is changed in the following manner when the following events occur in the bottle closure machine 113:
1. Disturbance, bottle closure machine 113:
   Slow down the bottle erector machine 101;
2. Jam, main flow, bottle closure machine 113:
   Slow down the bottle erector machine 101;
3. Initial alarm, jam, main flow, bottle closure machine 113:
   No speed change;
4. Jam, secondary flow, bottle closure machine 113:
   Slow down the bottle erector machine 101;

5. Shortage of main flow, bottle closure machine 113:
   Speed up the bottle erector machine 101;
6. Shortage of secondary flow, bottle closure machine 113:
   Slow down the bottle erector machine 101;
7. Initial alarm, shortage of main flow, bottle closure machine 113:
   Speed up the bottle erector machine 101.

The operating speed of the filling machine 104 is changed in the following manner when the following events occur in the bottle closure machine 113:
1. Disturbance, bottle closure machine 113:
   Same speed as the bottle closure machine 113;
2. Jam, main flow, bottle closure machine 113:
   Same speed as the bottle closure machine 113;
3. Initial alarm, jam, main flow, bottle closure machine 113:
   No speed change;
4. Jam, secondary flow, bottle closure machine 113:
   Same speed as the bottle closure machine 113;
5. Shortage of main flow, bottle closure machine 113:
   Same speed as the bottle closure machine 113;
6. Shortage of secondary flow, bottle closure machine 113:
   Same speed as the bottle closure machine 113;
7. Initial alarm, shortage of main flow, bottle closure machine 113:
   Same speed as the bottle closure machine 113.

The operating speed of the cap sorting machine 108 is changed in the following manner when the following events occur in the bottle closure machine 113:
1. Disturbance, bottle closure machine 113:
   Slow down the cap sorting machine 108;
2. Jam, main flow, bottle closure machine 113:
   Slow down the cap sorting machine 108;
3. Initial alarm, jam, main flow, bottle closure machine 113:
   No speed change;
4. Jam, secondary flow, bottle closure machine 113:
   Slow down the cap sorting machine 108;
5. Shortage of main flow, bottle closure machine 113:
   Slow down the cap sorting machine 108;
6. Shortage of secondary flow, bottle closure machine 113:
   Speed up the cap sorting machine 108;
7. Initial alarm, shortage of main flow, bottle closure machine 113:
   Slow down the cap sorting machine 108.

The operating speed of the cap aligner machine 107 is changed in the following manner when the following events occur in the bottle closure machine 113:
1. Disturbance, bottle closure machine 113:
   Same speed as the cap sorting machine 108;
2. Jam, main flow, bottle closure machine 113:
   Same speed as the cap sorting machine 108;
3. Initial alarm, jam, main flow, bottle closure machine 113:
   No speed change;
4. Jam, secondary flow, bottle closure machine 113:
   Same speed as the cap sorting machine 108;
5. Shortage of main flow, bottle closure machine 113:
   Same speed as the cap sorting machine 108;
6. Shortage of secondary flow, bottle closure machine 113:
   Same speed as the cap sorting machine 108;
7. Initial alarm, shortage of main flow, bottle closure machine 113:
   Same speed as the cap sorting machine 108.

The operating speed of the bottle closure machine 113 is changed in the following manner when the following events occur in the bottle closure machine 113:
1. Disturbance, bottle closure machine 113:
   Bottle closure machine 113 is stopped;
2. Jam, main flow, bottle closure machine 113:
   Bottle closure machine 113 is stopped;
3. Initial alarm, jam, main flow, bottle closure machine 113:
   No speed change;
4. Jam, secondary flow, bottle closure machine 113:
   Bottle closure machine 113 is stopped;
5. Shortage of main flow, bottle closure machine 113:
   Bottle closure machine 113 is stopped;
6. Shortage of secondary flow, bottle closure machine 113:
   Bottle closure machine 113 is stopped;
7. Initial alarm, shortage of main flow, bottle closure machine 113:
   Slow down the bottle closure machine 113.

The bottle shoe removal machine 115 is changed in the following manner when the following events occur in the bottle closure machine 113:
1. Disturbance, bottle closure machine 113:
   Slow down the bottle shoe removal machine 115;
2. Jam, main flow, bottle closure machine 113:
   Speed up the bottle shoe removal machine 115;
3. Initial alarm, jam, main flow, bottle closure machine 113:
   No speed change;
4. Jam, secondary flow, bottle closure machine 113:
   Speed up the bottle shoe removal machine 115;
5. Shortage of main flow, bottle closure machine 113:
   Slow down the bottle shoe removal machine 115;
6. Shortage of secondary flow, bottle closure machine 113:
   Slow down the bottle shoe removal machine 115;
7. Initial alarm, shortage of main flow, bottle closure machine 113:
   Slow down the bottle shoe removal machine 115.

The operating speed of the labeling machine 119 is changed in the following manner when the following events occur in the bottle closure machine 113:
1. Disturbance, bottle closure machine 113:
   Same speed as the bottle shoe removal machine 115;
2. Jam, main flow, bottle closure machine 113:
   Same speed as the bottle shoe removal machine 115;
3. Initial alarm, jam, main flow, bottle closure machine 113:
   No speed change;
4. Jam, secondary flow, bottle closure machine 113:
   Same speed as the bottle shoe removal machine 115;
5. Shortage of main flow, bottle closure machine 113:
   Same speed as the bottle shoe removal machine 115;
6. Shortage of secondary flow, bottle closure machine 113:
   Same speed as the bottle shoe removal machine 115;
7. Initial alarm, shortage of main flow, bottle closure machine 113:
   Same speed as the bottle shoe removal machine 115.

The operating speeds of the coding machine 121 and of the first sticker machine 122 as well as the second sticker machine 123 remain unchanged when the above events occur in the bottle closure machine 113.

The operating speed of the sheet shrinker machine 126 is changed in the following manner when the following events occur in the bottle closure machine 113:
1. Disturbance, bottle closure machine 113:
   Slow down the sheet shrinker machine 126;
2. Jam, main flow, bottle closure machine 113:
   Speed up the sheet shrinker machine 126;
3. Initial alarm, jam, main flow, bottle closure machine 113:
   No speed change;
4. Jam, secondary flow, bottle closure machine 113:
   Speed up the sheet shrinker machine 126;
5. Shortage of main flow, bottle closure machine 113:
   Slow down the sheet shrinker machine 126;

6. Shortage of secondary flow, bottle closure machine 113:
   Slow down the sheet shrinker machine 126;
7. Initial alarm, shortage of main flow, bottle closure machine 113:
   Slow down the sheet shrinker machine 126.

The operating speeds of the other machines 128, 129, 131, 132, 136, 139, 142 and 145 contained in the process line remain unchanged when the above events occur in the bottle closure machine 113.

The change to the operating speeds of the individual machines in the process line when the following events occur in the bottle shoe removal machine 115 will be explained in detail in the following text.

The operating speed of the bottle erector machine 101 is changed in the following manner when the following events occur in the bottle shoe removal machine 115:
1. Disturbance, bottle shoe removal machine 115:
   Slow down the bottle erector machine 101;
2. Jam, main flow, bottle shoe removal machine 115:
   Slow down the bottle erector machine 101;
3. Initial alarm, jam, main flow, bottle shoe removal machine 115:
   Slow down the bottle erector machine 101;
4. Jam, secondary flow, bottle shoe removal machine 115:
   Speed up the bottle erector machine 101;
5. Initial alarm, secondary flow, bottle shoe removal machine 115:
   Speed up the bottle erector machine 101;
6. Shortage of main flow, bottle shoe removal machine 115:
   Speed up the bottle erector machine 101;
7. Shortage of secondary flow, bottle shoe removal machine 115:
   No speed change;
8. Initial alarm, shortage of main flow, bottle shoe removal machine 115:
   Speed up the bottle erector machine 101.

The operating speed of the filling machine 104 is changed in the following manner when the following events occur in the bottle shoe removal machine 115:
1. Disturbance, bottle shoe removal machine 115:
   Same speed as the bottle closure machine 113;
2. Jam, main flow, bottle shoe removal machine 115.
   Same speed as the bottle closure machine 113;
3. Initial alarm, jam, main flow, bottle shoe removal machine 115:
   Same speed as the bottle closure machine 113;
4. Jam, secondary flow, bottle shoe removal machine 115:
   Same speed as the bottle closure machine 113;
5. Initial alarm, secondary flow, bottle shoe removal machine 115:
   Same speed as the bottle closure machine 113;
6. Shortage of main flow, bottle shoe removal machine 115:
   Same speed as the bottle closure machine 113;
7. Shortage of secondary flow, bottle shoe removal machine 115:
   No speed change;
8. Initial alarm, shortage of main flow, bottle shoe removal machine 115:
   Same speed as the bottle closure machine 113.

The operating speed of the cap sorting machine 108 is changed in the following manner when the following events occur in the bottle shoe removal machine 115:
1. Disturbance, bottle shoe removal machine 115:
   Slow down the cap sorting machine 108;
2. Jam, main flow, bottle shoe removal machine 115:
   Slow down the cap sorting machine 108;
3. Initial alarm, jam, main flow, bottle shoe removal machine 115:
   Slow down the cap sorting machine 108;
4. Jam, secondary flow, bottle shoe removal machine 115:
   Slow down the cap sorting machine 108;
5. Initial alarm, secondary flow, bottle shoe removal machine 115:
   Slow down the cap sorting machine 108;
6. Shortage of main flow, bottle shoe removal machine 115:
   Speed up the cap sorting machine 108;
7. Shortage of secondary flow, bottle shoe removal machine 115:
   No speed change;
8. Initial alarm, shortage of main flow, bottle shoe removal machine 115:
   Speed up the cap sorting machine 108.

The operating speed of the cap aligner machine 107 is changed in the following manner when the following events occur in the bottle shoe removal machine 115:
1. Disturbance, bottle shoe removal machine 115:
   Same speed as the cap sorting machine 108;
2. Jam, main flow, bottle shoe removal machine 115:
   Same speed as the cap sorting machine 108;
3. Initial alarm, jam, main flow, bottle shoe removal machine 115:
   Same speed as the cap sorting machine 108;
4. Jam, secondary flow, bottle shoe removal machine 115:
   Same speed as the cap sorting machine 108;
5. Initial alarm, secondary flow, bottle shoe removal machine 115:
   Same speed as the cap sorting machine 108;
6. Shortage of main flow, bottle shoe removal machine 115:
   Same speed as the cap sorting machine 108;
7. Shortage of secondary flow, bottle shoe removal machine 115:
   No speed change;
8. Initial alarm, shortage of main flow, bottle shoe removal machine 115:
   Same speed as the cap sorting machine 108.

The operating speed of the bottle closure machine 113 is changed in the following manner when the following events occur in the bottle shoe removal machine 115:
1. Disturbance, bottle shoe removal machine 115:
   Slow down the bottle closure machine 113;
2. Jam, main flow, bottle shoe removal machine 115:
   Slow down the bottle closure machine 113;
3. Initial alarm, jam, main flow, bottle shoe removal machine 115:
   Slow down the bottle closure machine 113;
4. Jam, secondary flow, bottle shoe removal machine 115:
   Slow down the bottle closure machine 113;
5. Initial alarm, secondary flow, bottle shoe removal machine 115:
   Slow down the bottle closure machine 113;
6. Shortage of main flow, bottle shoe removal machine 115:
   Speed up the bottle closure machine 113;
7. Shortage of secondary flow, bottle shoe removal machine 115:
   No speed change;
8. Initial alarm, shortage of main flow, bottle shoe removal machine 115:
   Speed up the bottle closure machine 113.

The operating speed of the bottle shoe removal machine 115 is changed in the following manner when the following events occur in the bottle shoe removal machine 115:
1. Disturbance, bottle shoe removal machine 115:
   Bottle shoe removal machine 115 is stopped;

2. Jam, main flow, bottle shoe removal machine 115:
   Bottle shoe removal machine 115 is stopped;
3. Initial alarm, jam, main flow, bottle shoe removal machine 115:
   Slow down the bottle shoe removal machine 115;
4. Jam, secondary flow, bottle shoe removal machine 115:
   Bottle shoe removal machine 115 is stopped;
5. Initial alarm, secondary flow, bottle shoe removal machine 115:
   Slow down the bottle shoe removal machine 115;
6. Shortage of main flow, bottle shoe removal machine 115:
   Bottle shoe removal machine 115 is stopped;
7. Shortage of secondary flow, bottle shoe removal machine 115:
   No speed change;
8. Initial alarm, shortage of main flow, bottle shoe removal machine 115:
   Slow down the bottle shoe removal machine 115.

The operating speed of the labeling machine 119 is changed in the following manner when the following events occur in the bottle shoe removal machine 115:
1. Disturbance, bottle shoe removal machine 115:
   Same speed as the bottle shoe removal machine 115;
2. Jam, main flow, bottle shoe removal machine 115:
   Same speed as the bottle shoe removal machine 115;
3. Initial alarm, jam, main flow, bottle shoe removal machine 115:
   Same speed as the bottle shoe removal machine 115;
4. Jam, secondary flow, bottle shoe removal machine 115:
   Same speed as the bottle shoe removal machine 115;
5. Initial alarm, secondary flow, bottle shoe removal machine 115:
   Same speed as the bottle shoe removal machine 115;
6. Shortage of main flow, bottle shoe removal machine 115:
   Same speed as the bottle shoe removal machine 115;
7. Shortage of secondary flow, bottle shoe removal machine 115:
   No speed change;
8. Initial alarm, shortage of main flow, bottle shoe removal machine 115:
   Same speed as the bottle shoe removal machine 115.

The operating speeds of the coding machine 121 and of the first sticker machine 122 as well as the second sticker machine 123 remain unchanged when the above events occur in the bottle shoe removal machine 115.

The operating speed of the sheet shrinker machine 126 is changed in the following manner when the following events occur in the bottle shoe removal machine 115:
1. Disturbance, bottle shoe removal machine 115:
   Slow down the sheet shrinker machine 126;
2. Jam, main flow, bottle shoe removal machine 115:
   Speed up the sheet shrinker machine 126;
3. Initial alarm, jam, main flow, bottle shoe removal machine 115;
   Speed up the sheet shrinker machine 126;
4. Jam, secondary flow, bottle shoe removal machine 115:
   Slow down the sheet shrinker machine 126;
5. Initial alarm, secondary flow, bottle shoe removal machine 115:
   Slow down the sheet shrinker machine 126;
6. Shortage of main flow, bottle shoe removal machine 115:
   Slow down the sheet shrinker machine 126;
7. Shortage of secondary flow, bottle shoe removal machine 115:
   No speed change;
8. Initial alarm, shortage of main flow, bottle shoe removal machine 115:
   Slow down the sheet shrinker machine 126.

The operating speeds of the other machines 128, 129, 131, 132, 136, 139, 142 and 145 remain unchanged when the above events occur in the bottle shoe removal machine 115.

The change to the operating speed of the individual machines in the process line when the following events occur in the labeling machine 119 will be explained in detail in the following text.

The operating speed of the bottle erector machine 101 is changed in the following manner when the following events occur in the labeling machine 119:
1. Disturbance, labeling machine 119:
   Slow down the bottle erector machine 101;
2. Jam, main flow, labeling machine 119:
   No speed change;
3. Initial alarm, jam, main flow, labeling machine 119:
   No speed change;
4. Jam, secondary flow, labeling machine 119:
   No speed change;
5. Shortage of main flow, labeling machine 119:
   No speed change;
6. Shortage of secondary flow, labeling machine 119:
   Slow down the bottle erector machine 101;
7. Initial alarm, shortage of main flow, labeling machine 119:
   No speed change.

The operating speed of the filling machine 104 is changed in the following manner when the following events occur in the labeling machine 119:
1. Disturbance, labeling machine 119:
   Same speed as the bottle closure machine 113;
2. Jam, main flow, labeling machine 119:
   No speed change;
3. Initial alarm, jam, main flow, labeling machine 119:
   No speed change;
4. Jam, secondary flow, labeling machine 119:
   No speed change;
5. Shortage of main flow, labeling machine 119:
   No speed change;
6. Shortage of secondary flow, labeling machine 119:
   Same speed as the bottle closure machine 113;
7. Initial alarm, shortage of main flow, labeling machine 119:
   No speed change.

The operating speed of the cap sorting machine 108 is changed in the following manner when the following events occur in the labeling machine 119:
1. Disturbance, labeling machine 119:
   Slow down the cap sorting machine 118;
2. Jam, main flow, labeling machine 119:
   No speed change;
3. Initial alarm, jam, main flow, labeling machine 119:
   No speed change;
4. Jam, secondary flow, labeling machine 119:
   No speed change;
5. Shortage of main flow, labeling machine 119:
   No speed change;
6. Shortage of secondary flow, labeling machine 119:
   Slow down the cap sorting machine 108;
7. Initial alarm, shortage of main flow, labeling machine 119:
   No speed change.

The operating speed of the cap aligner machine 107 is changed in the following manner when the following events occur in the labeling machine 119:
1. Disturbance, labeling machine 119:
   Same speed as the cap sorting machine 108;

2. Jam, main flow, labeling machine 119:
  No speed change;
3. Initial alarm, jam, main flow, labeling machine 119:
  No speed change;
4. Jam, secondary flow, labeling machine 119:
  No speed change;
5. Shortage of main flow, labeling machine 119:
  No speed change;
6. Shortage of secondary flow, labeling machine 119:
  Same speed as the cap sorting machine 108;
7. Initial alarm, shortage of main flow, labeling machine 119:
  No speed change.

The operating speed of the bottle closure machine 113 is changed in the following manner when the following events occur in the labeling machine 119:
1. Disturbance, labeling machine 119:
  Slow down the bottle closure machine 113;
2. Jam, main flow, labeling machine 119:
  No speed change;
3. Initial alarm, jam, main flow, labeling machine 119:
  No speed change;
4. Jam, secondary flow, labeling machine 119:
  No speed change;
5. Shortage of main flow, labeling machine 119:
  No speed change;
6. Shortage of secondary flow, labeling machine 119:
  Slow down the bottle closure machine 113;
7. Initial alarm, shortage of main flow, labeling machine 119:
  No speed change.

The operating speed of the bottle shoe removal machine 115 is changed in the following manner when the following events occur in the labeling machine 119:
1. Disturbance, labeling machine 119:
  Bottle shoe removal machine 115 is stopped;
2. Jam, main flow, labeling machine 119:
  No speed change;
3. Initial alarm, jam, main flow, labeling machine 119:
  No speed change;
4. Jam, secondary flow, labeling machine 119:
  No speed change;
5. Shortage of main flow, labeling machine 119:
  No speed change;
6. Shortage of secondary flow, labeling machine 119:
  Bottle shoe removal machine 115 is stopped;
7. Initial alarm, shortage of main flow, labeling machine 119:
  No speed change.

The operating speed of the labeling machine 119 is changed in the following manner when the following events occur in the labeling machine 119:
1. Disturbance, labeling machine 119:
  Labeling machine 119 is stopped;
2. Jam, main flow, labeling machine 119:
  No speed change;
3. Initial alarm, jam, main flow, labeling machine 119:
  No speed change;
4. Jam, secondary flow, labeling machine 119:
  No speed change;
5. Shortage of main flow, labeling machine 119:
  No speed change;
6. Shortage of secondary flow, labeling machine 119:
  Labeling machine 119 is stopped;
7. Initial alarm, shortage of main flow, labeling machine 119:
  No speed change.

The operating speeds of the coding machine 121 and of the first sticker machine 122 as well as the second sticker machine 123 remain unchanged when the above events occur in the labeling machine 119.

The operating speed of the sheet shrinker machine 126 is changed in the following manner when the following events occur in the labeling machine 119:
1. Disturbance, labeling machine 119:
  Slow down the sheet shrinker machine 126;
2. Jam, main flow, labeling machine 119:
  No speed change;
3. Initial alarm, jam, main flow, labeling machine 119:
  No speed change;
4. Jam, secondary flow, labeling machine 119:
  No speed change;
5. Shortage of main flow, labeling machine 119:
  No speed change;
6. Shortage of secondary flow, labeling machine 119:
  Slow down the sheet shrinker machine 126;
7. Initial alarm, shortage of main flow, labeling machine 119:
  No speed change.

The operating speeds of the other machines 128, 129, 131, 132, 136, 139, 142 and 145 in the process line remain unchanged when the above events occur in the labeling machine 119.

If a disturbance occurs in the coding machine 121, the speed of the individual machines is changed in the following manner:
  the bottle erector machine 101 is slowed down;
  the filling machine 104 is operated at the same speed as the bottle closure machine 113;
  the cap sorting machine 108 is slowed down;
  the cap aligner machine 107 is operated at the same speed as the cap sorting machine 108;
  the bottle closure machine 113 is slowed down;
  the bottle shoe removal machine 115 is stopped;
  the labeling machine 119 is stopped;
  the coding machine 121 is stopped;
  the sheet shrinker machine 126 is slowed down;
  the operating speeds of the other machines 122, 123, 128, 129, 131, 132, 136, 139, 142 and 145 remain unchanged.

The operating speeds of all the machines in the process line remain unchanged in response to all of the other events which occur in the coding machine 121.

The operating speed of the machines in the process line is changed as follows when a disturbance occurs in the first sticker machine 122:
  the bottle erector machine 101 is slowed down;
  the filling machine 104 is operated at the same speed as the bottle closure machine 113;
  the cap sorting machine 108 is slowed down;
  the cap aligner machine 107 is operated at the same speed as the cap sorting machine 108;
  the bottle closure machine 113 is slowed down;
  the bottle shoe removal machine 115 is slowed down;
  the labeling machine 119 is operated at the same speed as the bottle shoe removal machine 115;
  the first sticker machine 122 is stopped;
  the sheet shrinker machine 126 is slowed down;
  the operating speeds of the other machines 121, 123, 128, 129, 131, 132, 136, 139, 142 and 145 in the process line remain unchanged.

The operating speeds of all the machines in the process line remain unchanged in response to all of the other events which occur in the first sticker machine 122.

When a disturbance occurs in the second sticker machine 123, the operating speeds of the machines in the process line are changed in the following manner:
  the bottle erector machine 101 is slowed down;
  the filling machine 104 is operated at the same speed as the bottle closure machine 113;

the cap sorting machine 108 is slowed down;
the cap aligner machine 107 is operated at the same speed as the cap sorting machine 108;
the bottle closure machine 113 is slowed down;
the bottle shoe removal machine 115 is slowed down;
the labeling machine 119 is operated at the same speed as the bottle shoe removal machine 115;
the second sticker machine 123 is stopped;
the sheet shrinker machine 126 is slowed down;
the operating speeds of the other machines 121, 122, 128, 129, 131, 132, 136, 139, 142 and 145 in the process line remain unchanged.

The operating speeds of all the machines in the process line remain unchanged in response to all of the other events which occur in the first sticker machine 123.

The change to the operating speeds of the machines when the following events occur in the sheet shrinker machine 126 will be explained in more detail in the following text.

The operating speed of the bottle erector machine 101 is changed in the following manner when the following events occur in the sheet shrinker machine 126:
1. Disturbance, sheet shrinker machine 126:
   Slow down the bottle erector machine 101;
2. Jam, main flow, sheet shrinker machine 126:
   Slow down the bottle erector machine 101;
3. Initial alarm, jam, main flow, sheet shrinker machine 126:
   No speed change;
4. Jam, secondary flow, sheet shrinker machine 126:
   No speed change;
5. Shortage of main flow, sheet shrinker machine 126:
   Speed up the bottle erector machine 101;
6. Shortage of secondary flow, sheet shrinker machine 126:
   Slow down the bottle erector machine 101;
7. Initial alarm, shortage of main flow, sheet shrinker machine 126:
   No speed change.

The operating speed of the filling machine 104 is changed in the following manner when the following events occur in the sheet shrinker machine 126:
1. Disturbance, sheet shrinker machine 126:
   Same speed as the bottle closure machine 113;
2. Jam, main flow, sheet shrinker machine 126:
   Same speed as the bottle closure machine 113;
3. Initial alarm, jam, main flow, sheet shrinker machine 126:
   No speed change;
4. Jam, secondary flow, sheet shrinker machine 126:
   No speed change;
5. Shortage of main flow, sheet shrinker machine 126:
   Same speed as the bottle closure machine 113;
6. Shortage of secondary flow, sheet shrinker machine 126:
   Same speed as the bottle closure machine 113;
7. Initial alarm, shortage of main flow, sheet shrinker machine 126:
   No speed change.

The operating speed of the cap sorting machine 108 is changed in the following manner when the following events occur in the sheet shrinker machine 126:
1. Disturbance, sheet shrinker machine 126:
   Slow down the cap sorting machine 108;
2. Jam, main flow, sheet shrinker machine 126:
   Slow down the cap sorting machine 108;
3. Initial alarm, jam, main flow, sheet shrinker machine 126:
   No speed change;
4. Jam, secondary flow, sheet shrinker machine 126:
   No speed change;
5. Shortage of main flow, sheet shrinker machine 126:
   Speed up the cap sorting machine 108;
6. Shortage of secondary flow, sheet shrinker machine 126:
   Slow down the cap sorting machine 108;
7. Initial alarm, shortage of main flow, sheet shrinker machine 126:
   No speed change.

The operating speed of the cap aligner machine 107 is changed in the following manner when the following events occur in the sheet shrinker machine 126:
1. Disturbance, sheet shrinker machine 126:
   Same speed as the cap sorting machine 108;
2. Jam, main flow, sheet shrinker machine 126:
   Same speed as the cap sorting machine 108;
3. Initial alarm, jam, main flow, sheet shrinker machine 126:
   No speed change;
4. Jam, secondary flow, sheet shrinker machine 126:
   No speed change;
5. Shortage of main flow, sheet shrinker machine 126:
   Same speed as the cap sorting machine 108;
6. Shortage of secondary flow, sheet shrinker machine 126:
   Same speed as the cap sorting machine 108;
7. Initial alarm, shortage of main flow, sheet shrinker machine 126:
   No speed change.

The operating speed of the bottle closure machine 113 is changed in the following manner when the following events occur in the sheet shrinker machine 126:
1. Disturbance, sheet shrinker machine 126:
   Slow down the bottle closure machine 113;
2. Jam, main flow, sheet shrinker machine 126:
   Slow down the bottle closure machine 113;
3. Initial alarm, jam, main flow, sheet shrinker machine 126:
   No speed change;
4. Jam, secondary flow, sheet shrinker machine 126:
   No speed change;
5. Shortage of main flow, sheet shrinker machine 126:
   Speed up the bottle closure machine 113;
6. Shortage of secondary flow, sheet shrinker machine 126:
   Slow down the bottle closure machine 113;
7. Initial alarm, shortage of main flow, sheet shrinker machine 126:
   No speed change.

The operating speed of the bottle shoe removal machine 115 is changed in the following manner when the following events occur in the sheet shrinker machine 126:
1. Disturbance, sheet shrinker machine 126:
   Slow down the bottle shoe removal machine 115;
2. Jam, main flow, sheet shrinker machine 126:
   Slow down the bottle shoe removal machine 115;
3. Initial alarm, jam, main flow, sheet shrinker machine 126:
   No speed change;
4. Jam, secondary flow, sheet shrinker machine 126:
   No speed change;
5. Shortage of main flow, sheet shrinker machine 126:
   Speed up the bottle shoe removal machine 115;
6. Shortage of secondary flow, sheet shrinker machine 126:
   Slow down the bottle shoe removal machine 115;
7. Initial alarm, shortage of main flow, sheet shrinker machine 126:
   No speed change.

The operating speed of the labeling machine 119 is changed in the following manner when the following events occur in the sheet shrinker machine 126:
1. Disturbance, sheet shrinker machine 126:
   Same speed as the bottle shoe removal machine 115;
2. Jam, main flow, sheet shrinker machine 126:
   Same speed as the bottle shoe removal machine 115;

3. Initial alarm, jam, main flow, sheet shrinker machine 126:
No speed change;
4. Jam, secondary flow, sheet shrinker machine 126:
No speed change;
5. Shortage of main flow, sheet shrinker machine 126:
Same speed as the bottle shoe removal machine 115;
6. Shortage of secondary flow, sheet shrinker machine 126:
Same speed as the bottle shoe removal machine 115;
7. Initial alarm, shortage of main flow, sheet shrinker machine 126:
No speed change.

The operating speeds of the coding machine 121 and of the first sticker machine 122 as well as the second sticker machine 123 remain unchanged when the above events occur in the sheet shrinker machine 126.

The operating speed of the sheet shrinker machine 126 is changed in the following manner when the following events occur in the sheet shrinker machine 126:
1. Disturbance, sheet shrinker machine 126:
Sheet shrinker machine 126 is stopped;
2. Jam, main flow, sheet shrinker machine 126:
Sheet shrinker machine 126 is stopped;
3. Initial alarm, jam, main flow, sheet shrinker machine 126:
No speed change;
4. Jam, secondary flow, sheet shrinker machine 126:
No speed change;
5. Shortage of main flow, sheet shrinker machine 126:
Sheet shrinker machine 126 is stopped;
6. Shortage of secondary flow, sheet shrinker machine 126:
Sheet shrinker machine 126 is stopped;
7. Initial alarm, shortage of main flow, sheet shrinker machine 126:
No speed change.

The operating speeds of the other machines 128, 129, 131, 132, 136, 139, 142 and 145 in the process line remain unchanged when the above events occur in the sheet shrinker machine 126.

The operating speeds of the machines in the process line are changed in the following manner when a disturbance occurs in the third sticker machine 128:
the bottle erector machine 101 is slowed down;
the filling machine 104 is operated at the same speed as the bottle closure machine 113;
the cap sorting machine 108 is slowed down;
the cap aligner machine 107 is operated at the same speed as the cap sorting machine 108;
the bottle closure machine 113 is slowed down;
the bottle shoe removal machine 115 is slowed down;
the labeling machine 119 is operated at the same speed as the bottle shoe removal machine 115;
the sheet shrinker machine 126 is slowed down;
the third sticker machine 128 is stopped;
the operating speeds of the other machines 121, 122, 123, 129, 131, 132, 136, 139, 142 and 145 in the process line remain unchanged.

The operating speeds of all the machines in the process line remain unchanged when other events occur in the third sticker machine 128.

The operating speeds of the machines in the process line are changed in the following manner when a disturbance occurs in the fourth sticker machine 129:
the bottle erector machine 101 is slowed down;
the filling machine 104 is operated at the same speed as the bottle closure machine 113;
the cap sorting machine 108 is slowed down;
the cap aligner machine 107 is operated at the same speed as the cap sorting machine 108;
the bottle closure machine 113 is slowed down;
the bottle shoe removal machine 115 is slowed down;
the labeling machine 119 is operated at the same speed as the bottle shoe removal machine 115;
the sheet shrinker machine 126 is slowed down;
the fourth sticker machine 129 is stopped;
the operating speeds of the other machines 121, 122, 123, 128, 129, 131, 132, 136, 139, 142 and 145 in the process line remain unchanged.

The operating speeds of all the other machines in the process line remain unchanged if another event occurs in the fourth sticker machine 129.

The change to the operating speeds of the machines in the process line when the following events occur in the multiple pack erector machine 132 will be explained in more detail in the following text.

The operating speed of the bottle erector machine 101 is changed in the following manner when the following events occur in the multiple pack erector machine 132:
1. Disturbance, multiple pack erector machine 132:
Slow down the bottle erector machine 101;
2. Jam, main flow, multiple pack erector machine 132:
Speed up the bottle erector machine 101;
3. Initial alarm, jam, main flow, multiple pack erector machine 132:
No speed change;
4. Jam, secondary flow, multiple pack erector machine 132:
Sheet shrinker machine 126 is stopped;
5. Shortage of main flow, multiple pack erector machine 132:
Slow down the bottle erector machine 101;
6. Shortage of secondary flow, multiple pack erector machine 132:
Sheet shrinker machine 126 is stopped;
7. Initial alarm, shortage of main flow, multiple pack erector machine 132:
No speed change.

The operating speed of the filling machine 104 is changed in the following manner when the following events occur in the multiple pack erector machine 132:
1. Disturbance, multiple pack erector machine 132:
Same speed as the bottle closure machine 113;
2. Jam, main flow, multiple pack erector machine 132:
Same speed as the bottle closure machine 113;
3. Initial alarm, jam, main flow, multiple pack erector machine 132:
No speed change;
4. Jam, secondary flow, multiple pack erector machine 132:
No speed change;
5. Shortage of main flow, multiple pack erector machine 132:
Same speed as the bottle closure machine 113;
6. Shortage of secondary flow, multiple pack erector machine 132:
No speed change;
7. Initial alarm, shortage of main flow, multiple pack erector machine 132:
No speed change.

The operating speed of the cap sorting machine 108 is changed in the following manner when the following events occur in the multiple pack erector machine 132:
1. Disturbance, multiple pack erector machine 132:
Slow down the cap sorting machine 108;
2. Jam, main flow, multiple pack erector machine 132:
Speed up the cap sorting machine 108;

3. Initial alarm, jam, main flow, multiple pack erector machine 132:
No speed change;
4. Jam, secondary flow, multiple pack erector machine 132:
No speed change;
5. Shortage of main flow, multiple pack erector machine 132:
Slow down the cap sorting machine 108;
6. Shortage of secondary flow, multiple pack erector machine 132:
No speed change;
7. Initial alarm, shortage of main flow, multiple pack erector machine 132:
No speed change.

The operating speed of the cap aligner machine 107 is changed in the following manner when the following events occur in the multiple pack erector machine 132:
1. Disturbance, multiple pack erector machine 132:
Same speed as the cap sorting machine 108;
2. Jam, main flow, multiple pack erector machine 132:
Same speed as the cap sorting machine 108;
3. Initial alarm, jam, main flow, multiple pack erector machine 132:
No speed change;
4. Jam, secondary flow, multiple pack erector machine 132:
No speed change;
5. Shortage of main flow, multiple pack erector machine 132:
Same speed as the cap sorting machine 108;
6. Shortage of secondary flow, multiple pack erector machine 132:
No speed change;
7. Initial alarm, shortage of main flow, multiple pack erector machine 132:
No speed change.

The operating speed of the bottle closure machine 113 is changed in the following manner when the following events occur in the multiple pack erector machine 132:.
1. Disturbance, multiple pack erector machine 132:
Slow down the bottle closure machine 113;
2. Jam, main flow, multiple pack erector machine 132:
Speed up the bottle closure machine 113;
3. Initial alarm, jam, main flow, multiple pack erector machine 132:
No speed change;
4. Jam, secondary flow, multiple pack erector machine 132:
No speed change;
5. Shortage of main flow, multiple pack erector machine 132:
Slow down the bottle closure machine 113;
6. Shortage of secondary flow, multiple pack erector machine 132:
No speed change;
7. Initial alarm, shortage of main flow, multiple pack erector machine 132:
No speed change.

The operating speed of the bottle shoe removal machine 115 is changed in the following manner when the following events occur in the multiple pack erector machine 132:
1. Disturbance, multiple pack erector machine 132:
Slow down the bottle shoe removal machine 115;
2. Jam, main flow, multiple pack erector machine 132:
Speed up the bottle shoe removal machine 115;
3. Initial alarm, jam, main flow, multiple pack erector machine 132:
No speed change;
4. Jam, secondary flow, multiple pack erector machine 132:
No speed change;
5. Shortage of main flow, multiple pack erector machine 132:
Slow down the bottle shoe removal machine 115;
6. Shortage of secondary flow, multiple pack erector machine 132:
No speed change;
7. Initial alarm, shortage of main flow, multiple pack erector machine 132:
No speed change.

The operating speed of the labeling machine 119 is changed in the following manner when the following events occur in the multiple pack erector machine 132:
1. Disturbance, multiple pack erector machine 132:
Same speed as the bottle shoe removal machine 115;
2. Jam, main flow, multiple pack erector machine 132:
Same speed as the bottle shoe removal machine 115;
3. Initial alarm, jam, main flow, multiple pack erector machine 132:
No speed change;
4. Jam, secondary flow, multiple pack erector machine 132:
No speed change;
5. Shortage of main flow, multiple pack erector machine 132:
Same speed as the bottle shoe removal machine 115;
6. Shortage of secondary flow, multiple pack erector machine 132:
No speed change;
7. Initial alarm, shortage of main flow, multiple pack erector machine 132:
No speed change.

The operating speeds of the coding machine 121 and of the first sticker machine 122 as well as the second sticker machine 123 remain unchanged when the above events occur in the multiple pack erector machine 132.

The operating speed of the sheet shrinker machine 126 is changed in the following manner when the following events occur in the multiple pack erector machine 132:
1. Disturbance, multiple pack erector machine 132:
Slow down the sheet shrinker machine 126;
2. Jam, main flow, multiple pack erector machine 132:
Speed up the sheet shrinker machine 126;
3. Initial alarm, jam, main flow, multiple pack erector machine 132:
No speed change;
4. Jam, secondary flow, multiple pack erector machine 132:
No speed change;
5. Shortage of main flow, multiple pack erector machine 132:
Slow down the sheet shrinker machine 126;
6. Shortage of secondary flow, multiple pack erector machine 132:
No speed change;
7. Initial alarm, shortage of main flow, multiple pack erector machine 132:
No speed change.

The operating speed of the multiple pack erector machine 132 is changed in the following manner when the following events occur in the multiple pack erector machine 132:
1. Disturbance, multiple pack erector machine 132:
The multiple pack erector machine 132 is stopped;
2. Jam, main flow, multiple pack erector machine 132:
The multiple pack erector machine 132 is stopped;
3. Initial alarm, jam, main flow, multiple pack erector machine 132:
No speed change;

4. Jam, secondary flow, multiple pack erector machine 132:
   No speed change;
5. Shortage of main flow, multiple pack erector machine 132:
   The multiple pack erector machine 132 is stopped;
6. Shortage of secondary flow, multiple pack erector machine 132:
   No speed change;
7. Initial alarm, shortage of main flow, multiple pack erector machine 132:
   No speed change.

The operating speeds of the other machines 128, 129, 131, 136, 139, 142 and 145 remain unchanged when the above events occur in the multiple pack erector machine 132.

The changes to the operating speeds of the machines in the process line when the following events occur in the carton packaging machine 131 will be explained in more detail in the following text.

The operating speed of the bottle erector machine 101 is changed in the following manner when the following events occur in the carton packaging machine 131:
1. Disturbance, carton packaging machine 131:
   Slow down the bottle erector machine 101;
2. Jam, main flow, carton packaging machine 131:
   Slow down the bottle erector machine 101;
3. Initial alarm, jam, main flow, carton packaging machine 131:
   No speed change;
4. Jam, secondary flow, carton packaging machine 131:
   No speed change;
5. Shortage of main flow, carton packaging machine 131:
   Speed up the bottle erector machine 101;
6. Shortage of secondary flow, carton packaging machine 131:
   Slow down the bottle erector machine 101;
7. Initial alarm, shortage of main flow, carton packaging machine 131:
   No speed change.

The operating speed of the filling machine 104 is changed in the following manner when the following events occur in the carton packaging machine 131:
1. Disturbance, carton packaging machine 131:
   Same speed as the bottle closure machine 113;
2. Jam, main flow, carton packaging machine 131:
   Same speed as the bottle closure machine 113;
3. Initial alarm, jam, main flow, carton packaging machine 131:
   No speed change;
4. Jam, secondary flow, carton packaging machine 131:
   No speed change;
5. Shortage of main flow, carton packaging machine 131:
   Same speed as the bottle closure machine 113;
6. Shortage of secondary flow, carton packaging machine 131:
   Same speed as the bottle closure machine 113;
7. Initial alarm, shortage of main flow, carton packaging machine 131:
   No speed change.

The operating speed of the cap sorting machine 108 is changed in the following manner when the following events occur in the carton packaging machine 131:
1. Disturbance, carton packaging machine 131:
   Slow down the cap sorting machine 108;
2. Jam, main flow, carton packaging machine 131:
   Slow down the cap sorting machine 108;
3. Initial alarm, jam, main flow, carton packaging machine 131:
   No speed change;
4. Jam, secondary flow, carton packaging machine 131:
   No speed change;
5. Shortage of main flow, carton packaging machine 131:
   Speed up the cap sorting machine 108;
6. Shortage of secondary flow, carton packaging machine 131:
   Slow down the cap sorting machine 108;
7. Initial alarm, shortage of main flow, carton packaging machine 131:
   No speed change.

The operating speed of the cap aligner machine 107 is changed in the following manner when the following events occur in the carton packaging machine 131:
1. Disturbance, carton packaging machine 131:
   Same speed as the cap sorting machine 108;
2. Jam, main flow, carton packaging machine 131:
   Same speed as the cap sorting machine 108;
3. Initial alarm, jam, main flow, carton packaging machine 131:
   No speed change;
4. Jam, secondary flow, carton packaging machine 131:
   No speed change;
5. Shortage of main flow, carton packaging machine 131:
   Same speed as the cap sorting machine 108;
6. Shortage of secondary flow, carton packaging machine 131:
   Same speed as the cap sorting machine 108;
7. Initial alarm, shortage of main flow, carton packaging machine 131:
   No speed change.

The operating speed of the bottle closure machine 113 is changed in the following manner when the following events occur in the carton packaging machine 131:
1. Disturbance, carton packaging machine 131:
   Slow down the bottle closure machine 113;
2. Jam, main flow, carton packaging machine 131:
   Slow down the bottle closure machine 113;
3. Initial alarm, jam, main flow, carton packaging machine 131:
   No speed change;
4. Jam, secondary flow, carton packaging machine 131:
   No speed change;
5. Shortage of main flow, carton packaging machine 131:
   Speed up the bottle closure machine 113;
6. Shortage of secondary flow, carton packaging machine 131:
   Slow down the bottle closure machine 113;
7. Initial alarm, shortage of main flow, carton packaging machine 131:
   No speed change.

The operating speed of the bottle shoe removal machine 115 is changed in the following manner when the following events occur in the carton packaging machine 131:
1. Disturbance, carton packaging machine 131:
   Slow down the bottle shoe removal machine 115;
2. Jam, main flow, carton packaging machine 131:
   Slow down the bottle shoe removal machine 115;
3. Initial alarm, jam, main flow, carton packaging machine 131:
   No speed change;
4. Jam, secondary flow, carton packaging machine 131:
   No speed change;
5. Shortage of main flow, carton packaging machine 131:
   Speed up the bottle shoe removal machine 115;

6. Shortage of secondary flow, carton packaging machine 131:
   Slow down the bottle shoe removal machine 115;
7. Initial alarm, shortage of main flow, carton packaging machine 131:
   No speed change.

The operating speed of the labeling machine 119 is changed in the following manner when the following events occur in the carton packaging machine 131:
1. Disturbance, carton packaging machine 131:
   Same speed as the bottle shoe removal machine 115;
2. Jam, main flow, carton packaging machine 131:
   Same speed as the bottle shoe removal machine 115;
3. Initial alarm, jam, main flow, carton packaging machine 131:
   No speed change;
4. Jam, secondary flow, carton packaging machine 131:
   No speed change;
5. Shortage of main flow, carton packaging machine 131:
   Same speed as the bottle shoe removal machine 115;
6. Shortage of secondary flow, carton packaging machine 131:
   Same speed as the bottle shoe removal machine 115;
7. Initial alarm, shortage of main flow, carton packaging machine 131:
   No speed change.

The operating speeds of the coding machine 121, of the first sticker machine 122 and of the second sticker machine 123 remain unchanged when the events described above occur in the carton packaging machine 131.

The operating speed of the sheet shrinker machine 126 is changed in the following manner when the following events occur in the carton packaging machine 131:
1. Disturbance, carton packaging machine 131:
   Slow down the sheet shrinker machine 126;
2. Jam, main flow, carton packaging machine 131:
   Slow down the sheet shrinker machine 126;
3. Initial alarm, jam, main flow, carton packaging machine 131:
   No speed change;
4. Jam, secondary flow, carton packaging machine 131:
   No speed change;
5. Shortage of main flow, carton packaging machine 131:
   Speed up the sheet shrinker machine 126;
6. Shortage of secondary flow, carton packaging machine 131:
   Slow down the sheet shrinker machine 126;
7. Initial alarm, shortage of main flow, carton packaging machine 131:
   No speed change.

The operating speed of the carton packaging machine 131 is changed in the following manner when the following events occur in the carton packaging machine 131:
1. Disturbance, carton packaging machine 131:
   The carton packaging machine 131 is stopped;
2. Jam, main flow, carton packaging machine 131:
   The carton packaging machine 131 is stopped;
3. Initial alarm, jam, main flow, carton packaging machine 131:
   No speed change;
4. Jam, secondary flow, carton packaging machine 131:
   No speed change;
5. Shortage of main flow, carton packaging machine 131:
   The carton packaging machine 131 is stopped;
6. Shortage of secondary flow, carton packaging machine 131:
   The carton packaging machine 131 is stopped;
7. Initial alarm, shortage of main flow, carton packaging machine 131:
   No speed change.

The operating speeds of the other machines 128, 129, 132, 136, 139, 142 and 145 remain unchanged when the events described above occur in the carton packaging machine 131.

The change to the operating speeds of the individual machines when the following events occur in the carton closure machine 136 will be explained in more detail in the following text.

The operating speed of the bottle erector machine 101 is changed in the following manner when the following events occur in the carton closure machine 136:
1. Disturbance, carton closure machine 136:
   Slow down the bottle erector machine 101;
2. Jam, main flow, carton closure machine 136:
   Slow down the bottle erector machine 101;
3. Initial alarm, jam, main flow, carton closure machine 136:
   No speed change;
4. Jam, secondary flow, carton closure machine 136:
   No speed change;
5. Shortage of main flow, carton closure machine 136:
   Speed up the bottle erector machine 101;
6. Shortage of secondary flow, carton closure machine 136:
   Slow down the bottle erector machine 101;
7. Initial alarm, shortage of main flow, carton closure machine 136:
   No speed change.

The operating speed of the filling machine 104 is changed in the following manner when the following events occur in the carton closure machine 136:
1. Disturbance, carton closure machine 136:
   Same speed as the bottle closure machine 113;
2. Jam, main flow, carton closure machine 136:
   Same speed as the bottle closure machine 113;
3. Initial alarm, jam, main flow, carton closure machine 136:
   No speed change;
4. Jam, secondary flow, carton closure machine 136:
   No speed change;
5. Shortage of main flow, carton closure machine 136:
   Same speed as the bottle closure machine 113;
6. Shortage of secondary flow, carton closure machine 136:
   Same speed as the bottle closure machine 113;
7. Initial alarm, shortage of main flow, carton closure machine 136:
   No speed change.

The operating speed of the cap sorting machine 108 is changed in the following manner when the following events occur in the carton closure machine 136:
1. Disturbance, carton closure machine 136:
   Slow down the cap sorting machine 108;
2. Jam, main flow, carton closure machine 136:
   Slow down the cap sorting machine 108;
3. Initial alarm, jam, main flow, carton closure machine 136:
   No speed change;
4. Jam, secondary flow, carton closure machine 136:
   No speed change;
5. Shortage of main flow, carton closure machine 136:
   Speed up the cap sorting machine 108;
6. Shortage of secondary flow, carton closure machine 136:
   Slow down the cap sorting machine 108;
7. Initial alarm, shortage of main flow, carton closure machine 136:
   No speed change.

The operating speed of the cap aligner machine 107 is changed in the following manner when the following events occur in the carton closure machine 136:
1. Disturbance, carton closure machine 136:
   Same speed as the cap sorting machine 108;
2. Jam, main flow, carton closure machine 136:
   Same speed as the cap sorting machine 108;
3. Initial alarm, jam, main flow, carton closure machine 136:
   No speed change;
4. Jam, secondary flow, carton closure machine 136:
   No speed change;
5. Shortage of main flow, carton closure machine 136:
   Same speed as the cap sorting machine 108;
6. Shortage of secondary flow, carton closure machine 136:
   Same speed as the cap sorting machine 108;
7. Initial alarm, shortage of main flow, carton closure machine 136:
   No speed change.

The operating speed of the bottle closure machine 113 is changed in the following manner when the following events occur in the carton closure machine 136:
1. Disturbance, carton closure machine 136:
   Slow down the bottle closure machine 113;
2. Jam, main flow, carton closure machine 136:
   Slow down the bottle closure machine 113;
3. Initial alarm, jam, main flow, carton closure machine 136:
   No speed change;
4. Jam, secondary flow, carton closure machine 136:
   No speed change;
5. Shortage of main flow, carton closure machine 136:
   Speed up the bottle closure machine 113;
6. Shortage of secondary flow, carton closure machine 136:
   Slow down the bottle closure machine 113;
7. Initial alarm, shortage of main flow, carton closure machine 136:
   No speed change.

The operating speed of the bottle shoe removal machine 115 is changed in the following manner when the following events occur in the carton closure machine 136:
1. Disturbance, carton closure machine 136:
   Slow down the bottle shoe removal machine 115;.
2. Jam, main flow, carton closure machine 136:
   Slow down the bottle shoe removal machine 115;
3. Initial alarm, jam, main flow, carton closure machine 136:
   No speed change;
4. Jam, secondary flow, carton closure machine 136:
   No speed change;
5. Shortage of main flow, carton closure machine 136:
   Speed up the bottle shoe removal machine 115;
6. Shortage of secondary flow, carton closure machine 136:
   Slow down the bottle shoe removal machine 115;
7. Initial alarm, shortage of main flow, carton closure machine 136:
   No speed change.

The operating speed of the labeling machine 119 is changed in the following manner when the following events occur in the carton closure machine 136:
1. Disturbance, carton closure machine 136:
   Same speed as the bottle shoe removal machine 115;
2. Jam, main flow, carton closure machine 136:
   Same speed as the bottle shoe removal machine 115;
3. Initial alarm, jam, main flow, carton closure machine 136:
   No speed change;
4. Jam, secondary flow, carton closure machine 136:
   No speed change;
5. Shortage of main flow, carton closure machine 136:
   Same speed as the bottle shoe removal machine 115;
6. Shortage of secondary flow, carton closure machine 136:
   Same speed as the bottle shoe removal machine 115;
7. Initial alarm, shortage of main flow, carton closure machine 136:
   No speed change.

The operating speeds of the coding machine 121, of the first sticker machine 122 and of the second sticker machine 123 remain unchanged when the above events occur in the carton closure machine 136.

The operating speed of the sheet shrinker machine 126 is changed in the following manner when the following events occur in the carton closure machine 135:
1. Disturbance, carton closure machine 136:
   Slow down the sheet shrinker machine 126;
2. Jam, main flow, carton closure machine 136:
   Slow down the sheet shrinker machine 126;
3. Initial alarm, jam, main flow, carton closure machine 136:
   No speed change;
4. Jam, secondary flow, carton closure machine 136:
   No speed change;
5. Shortage of main flow, carton closure machine 136:
   Speed up the sheet shrinker machine 126;
6. Shortage of secondary flow, carton closure machine 136:
   Slow down the sheet shrinker machine 126;
7. Initial alarm, shortage of main flow, carton closure machine 136:
   No speed change.

The operating speed of the carton closure machine 136 is changed in the following manner when the following events occur in the carton closure machine 136:
1. Disturbance, carton closure machine 136:
   The carton closure machine 136 is stopped;
2. Jam, main flow, carton closure machine 136:
   The carton closure machine 136 is stopped;
3. Initial alarm, jam, main flow, carton closure machine 136:
   No speed change;
4. Jam, secondary flow, carton closure machine 136:
   No speed change;
5. Shortage of main flow, carton closure machine 136:
   The carton closure machine 136 is stopped;
6. Shortage of secondary flow, carton closure machine 136:
   The carton closure machine 136 is stopped;
7. Initial alarm, shortage of main flow, carton closure machine 136:
   No speed change.

The operating speeds of the other machines 128, 129, 131, 132, 139, 142 and 145 in the process line remain unchanged when the above events occur in the carton closure machine 136.

The changes to the operating speeds of the machines in the process line when the following events occur in the carton label printing machine 139 will be explained in more detail in the following text.

The operating speed of the bottle erector machine 101 is changed in the following manner when the following events occur in the carton label printing machine 139:
1. Disturbance, carton label printing machine 139:
   Slow down the bottle erector machine 101;
2. Jam, main flow, carton label printing machine 139:
   Slow down the bottle erector machine 101;
3. Initial alarm, jam, main flow, carton label printing machine 139:
   No speed change;
4. Jam, secondary flow, carton label printing machine 139:
   No speed change;
5. Shortage of main flow, carton label printing machine 139:
   Speed up the bottle erector machine 101;

6. Shortage of secondary flow, carton label printing machine 139:
   Slow down the bottle erector machine 101;
7. Initial alarm, shortage of main flow, carton label printing machine 139:
   No speed change.

The operating speed of the filling machine 104 is changed in the following manner when the following events occur in the carton label printing machine 139:
1. Disturbance, carton label printing machine 139:
   Same speed as the bottle closure machine 113;
2. Jam, main flow, carton label printing machine 139:
   Same speed as the bottle closure machine 113;
3. Initial alarm, jam, main flow, carton label printing machine 139:
   No speed change;
4. Jam, secondary flow, carton label printing machine 139:
   No speed change;
5. Shortage of main flow, carton label printing machine 139:
   Same speed as the bottle closure machine 113;
6. Shortage of secondary flow, carton label printing machine 139:
   Same speed as the bottle closure machine 113;
7. Initial alarm, shortage of main flow, carton label printing machine 139:
   No speed change.

The operating speed of the cap sorting machine 108 is changed in the following manner when the following events occur in the carton label printing machine 139:
1. Disturbance, carton label printing machine 139:
   Slow down the cap sorting machine 108;
2. Jam, main flow, carton label printing machine 139:
   Slow down the cap sorting machine 108;
3. Initial alarm, jam, main flow, carton label printing machine 139:
   No speed change;
4. Jam, secondary flow, carton label printing machine 139:
   No speed change;
5. Shortage of main flow, carton label printing machine 139:
   Speed up the cap sorting machine 108;
6. Shortage of secondary flow, carton label printing machine 139:
   Slow down the cap sorting machine 108;
7. Initial alarm, shortage of main flow, carton label printing machine 139:
   No speed change.

The operating speed of the cap aligner machine 107 is changed in the following manner when the following events occur in the carton label printing machine 139:
1. Disturbance, carton label printing machine 139:
   Same speed as the cap sorting machine 108;
2. Jam, main flow, carton label printing machine 139:
   Same speed as the cap sorting machine 108;
3. Initial alarm, jam, main flow, carton label printing machine 139:
   No speed change;
4. Jam, secondary flow, carton label printing machine 139:
   No speed change;
5. Shortage of main flow, carton label printing machine 139:
   Same speed as the cap sorting machine 108;
6. Shortage of secondary flow, carton label printing machine 139:
   Same speed as the cap sorting machine 108;
7. Initial alarm, shortage of main flow, carton label printing machine 139:
   No speed change.

The operating speed of the bottle closure machine 113 is changed in the following manner when the following events occur in the carton label printing machine 139:
1. Disturbance, carton label printing machine 139:
   Slow down the bottle closure machine 113;
2. Jam, main flow, carton label printing machine 139:
   Slow down the bottle closure machine 113;
3. Initial alarm, jam, main flow, carton label printing machine 139:
   No speed change;
4. Jam, secondary flow, carton label printing machine 139:
   No speed change;
5. Shortage of main flow, carton label printing machine 139:
   Speed up the bottle closure machine 113;
6. Shortage of secondary flow, carton label printing machine 139:
   Slow down the bottle closure machine 113;
7. Initial alarm, shortage of main flow, carton label printing machine 139:
   No speed change.

The operating speed of the bottle shoe removal machine 115 is changed in the following manner when the following events occur in the carton label printing machine 139:
1. Disturbance, carton label printing machine 139:
   Slow down the bottle shoe removal machine 115;
2. Jam, main flow, carton label printing machine 139:
   Slow down the bottle shoe removal machine 115;
3. Initial alarm, jam, main flow, carton label printing machine 139:
   No speed change;
4. Jam, secondary flow, carton label printing machine 139:
   No speed change;
5. Shortage of main flow, carton label printing machine 139:
   Speed up the bottle shoe removal machine 115;
6. Shortage of secondary flow, carton label printing machine 139:
   Slow down the bottle shoe removal machine 115;
7. Initial alarm, shortage of main flow, carton label printing machine 139:
   No speed change.

The operating speed of the labeling machine 119 is changed in the following manner when the following events occur in the carton label printing machine 139:
1. Disturbance, carton label printing machine 139:
   Same speed as the bottle shoe removal machine 115;
2. Jam, main flow, carton label printing machine 139:
   Same speed as the bottle shoe removal machine 115;
3. Initial alarm, jam, main flow, carton label printing machine 139:
   No speed change;
4. Jam, secondary flow, carton label printing machine 139:
   No speed change;
5. Shortage of main flow, carton label printing machine 139:
   Same speed as the bottle shoe removal machine 115;
6. Shortage of secondary flow, carton label printing machine 139:
   Same speed as the bottle shoe removal machine 115;
7. Initial alarm, shortage of main flow, carton label printing machine 139:
   No speed change.

The operating speeds of the coding machine 121, of the first sticker machine 122 and of the second sticker machine 123 remain unchanged when the above events occur in the carton label printing machine 139.

The operating speed of the sheet shrinker machine 126 is changed in the following manner when the following events occur in the carton label printing machine 139:
1. Disturbance, carton label printing machine 139:
   Slow down the sheet shrinker machine 126;
2. Jam, main flow, carton label printing machine 139:
   Slow down the sheet shrinker machine 126;
3. Initial alarm, jam, main flow, carton label printing machine 139:
   No speed change;
4. Jam, secondary flow, carton label printing machine 139:
   No speed change;
5. Shortage of main flow, carton label printing machine 139:
   Speed up the sheet shrinker machine 126;
6. Shortage of secondary flow, carton label printing machine 139:
   Slow down the sheet shrinker machine 126;
7. Initial alarm, shortage of main flow, carton label printing machine 139:
   No speed change.

The operating speed of the carton label printing machine 139 is changed in the following manner when the following events occur in the carton label printing machine 139:
1. Disturbance, carton label printing machine 139:
   The carton label printing machine 139 is stopped;
2. Jam, main flow, carton label printing machine 139:
   The carton label printing machine 139 is stopped;
3. Initial alarm, jam, main flow, carton label printing machine 139:
   No speed change;
4. Jam, secondary flow, carton label printing machine 139:
   No speed change;
5. Shortage of main flow, carton label printing machine 139:
   The carton label printing machine 139 is stopped;
6. Shortage of secondary flow, carton label printing machine 139:
   The carton label printing machine 139 is stopped;
7. Initial alarm, shortage of main flow, carton label printing machine 139:
   No speed change.

The other machines 128, 129, 131, 132, 136, 142 and 145 in the process line remain unchanged when the events described above occur in the carton label printing machine 139.

The change to the operating speeds of the machines in the process line when the following events occur in the check weighing facility 142 will be explained in more detail in the following text.

The operating speed of the bottle erector machine 101 is changed in the following manner when the following events occur in the check weighing facility 142:
1. Disturbance, check weighing facility:
   Slow down the bottle erector machine 101;
2. Jam, main flow, check weighing facility 142:
   Slow down the bottle erector machine 101;
3. Initial alarm, jam, main flow, check weighing facility 142:
   No speed change;
4. Jam, secondary flow, check weighing facility 142:
   No speed change;
5. Shortage of main flow, check weighing facility 142:
   Speed up the bottle erector machine 101;
6. Shortage of secondary flow, check weighing facility 142:
   No speed change;
7. Initial alarm, shortage of main flow, check weighing facility 142:
   No speed change.

The operating speed of the filling machine 104 is changed in the following manner when the following events occur in the check weighing facility 142:
1. Disturbance, check weighing facility:
   Same speed as the bottle closure machine 113;
2. Jam, main flow, check weighing facility 142:
   Same speed as the bottle closure machine 113;
3. Initial alarm, jam, main flow, check weighing facility 142:
   No speed change;
4. Jam, secondary flow, check weighing facility 142:
   No speed change;
5. Shortage of main flow, check weighing facility 142:
   Same speed as the bottle closure machine 113;
6. Shortage of secondary flow, check weighing facility 142:
   No speed change;
7. Initial alarm, shortage of main flow, check weighing facility 142:
   No speed change.

The operating speed of the cap sorting machine 108 is changed in the following manner when the following events occur in the check weighing facility 142:
1. Disturbance, check weighing facility:
   Slow down the cap sorting machine 108;
2. Jam, main flow, check weighing facility 142:
   Slow down the cap sorting machine 108;
3. Initial alarm, jam, main flow, check weighing facility 142:
   No speed change;
4. Jam, secondary flow, check weighing facility 142:
   No speed change;
5. Shortage of main flow, check weighing facility 142:
   Speed up the cap sorting machine 108;
6. Shortage of secondary flow, check weighing facility 142:
   No speed change;
7. Initial alarm, shortage of main flow, check weighing facility 142:
   No speed change.

The operating speed of the cap aligner machine 107 is changed in the following manner when the following events occur in the check weighing facility 142:
1. Disturbance, check weighing facility:
   Same speed as the cap sorting machine 108;
2. Jam, main flow, check weighing facility 142:
   Same speed as the cap sorting machine 108;
3. Initial alarm, jam, main flow, check weighing facility 142:
   No speed change;
4. Jam, secondary flow, check weighing facility 142:
   No speed change;
5. Shortage of main flow, check weighing facility 142:
   Same speed as the cap sorting machine 108;
6. Shortage of secondary flow, check weighing facility 142:
   No speed change;
7. Initial alarm, shortage of main flow, check weighing facility 142:
   No speed change.

The operating speed of the bottle closure machine 113 is changed in the following manner when the following events occur in the check weighing facility 142:
1. Disturbance, check weighing facility:
   Slow down the bottle closure machine 113;
2. Jam, main flow, check weighing facility 142:
   Slow down the bottle closure machine 113;
3. Initial alarm, jam, main flow, check weighing facility 142:
   No speed change;
4. Jam, secondary flow, check weighing facility 142:
   No speed change;
5. Shortage of main flow, check weighing facility 142:
   Speed up the bottle closure machine 113;

6. Shortage of secondary flow, check weighing facility 142:
No speed change;
7. Initial alarm, shortage of main flow, check weighing facility 142:
No speed change.

The operating speed of the bottle shoe removal machine 115 is changed in the following manner when the following events occur in the check weighing facility 142:
1. Disturbance, check weighing facility:
Slow down the bottle shoe removal machine 115;
2. Jam, main flow, check weighing facility 142:
Slow down the bottle shoe removal machine 115;
3. Initial alarm, jam, main flow, check weighing facility 142:
No speed change;
4. Jam, secondary flow, check weighing facility 142:
No speed change;
5. Shortage of main flow, check weighing facility 142:
Speed up the bottle shoe removal machine 115;
6. Shortage of secondary flow, check weighing facility 142:
No speed change;
7. Initial alarm, shortage of main flow, check weighing facility 142:
No speed change.

The operating speed of the labeling machine 119 is changed in the following manner when the following events occur in the check weighing facility 142:
1. Disturbance, check weighing facility:
Same speed as the bottle shoe removal machine 115;
2. Jam, main flow, check weighing facility 142:
Same speed as the bottle shoe removal machine 115;
3. Initial alarm, jam, main flow, check weighing facility 142:
No speed change;
4. Jam, secondary flow, check weighing facility 142:
No speed change;
5. Shortage of main flow, check weighing facility 142:
Same speed as the bottle shoe removal machine 115;
6. Shortage of secondary flow, check weighing facility 142:
No speed change;
7. Initial alarm, shortage of main flow, check weighing facility 142:
No speed change.

The operating speeds of the coding machine 121, of the first sticker machine 122 and of the second sticker machine 123 remain unchanged when the above events occur in the check weighing facility 142.

The operating speed of the sheet shrinker machine 126 is changed in the following manner when the following events occur in the check weighing facility 142:
1. Disturbance, check weighing facility:
Slow down the sheet shrinker machine 126;
2. Jam, main flow, check weighing facility 142:
Slow down the sheet shrinker machine 126;
3. Initial alarm, jam, main flow, check weighing facility 142:
No speed change;
4. Jam, secondary flow, check weighing facility 142:
No speed change;
5. Shortage of main flow, check weighing facility 142:
Speed up the sheet shrinker machine 126;
6. Shortage of secondary flow, check weighing facility 142:
No speed change;
7. Initial alarm, shortage of main flow, check weighing facility 142:
No speed change.

The operating speed of the check weighing facility 142 is changed in the following manner when the following events occur in the check weighing facility 142:
1. Disturbance, check weighing facility:
The check weighing facility 142 is stopped;
2. Jam, main flow, check weighing facility 142:
The check weighing facility 142 is stopped;
3. Initial alarm, jam, main flow, check weighing facility 142:
No speed change;
4. Jam, secondary flow, check weighing facility 142:
No speed change;
5. Shortage of main flow, check weighing facility 142:
The check weighing facility 142 is stopped;
6. Shortage of secondary flow, check weighing facility 142:
No speed change;
7. Initial alarm, shortage of main flow, check weighing facility 142:
No speed change.

The operating speeds of the other machines 128, 129, 131, 132, 136, 139 and 145 remain unchanged when the above events occur in the check weighing facility 142.

The changes to the operating speeds of the machines in the process line when the following events occur in the palletization machine 145 will be explained in more detail in the following text.

The operating speed of the bottle erector machine 101 is changed in the following manner when the following events occur in the palletization machine 145:
1. Disturbance, palletization machine 145:
Slow down the bottle erector machine 101;
2. Jam, main flow, palletization machine 145:
Slow down the bottle erector machine 101;
3. Initial alarm, jam, main flow, palletization machine 145:
No speed change;
4. Jam, secondary flow, palletization machine 145:
No speed change;
5. Shortage of main flow, palletization machine 145:
Speed up the bottle erector machine 101;
6. Shortage of secondary flow, palletization machine 145:
Slow down the bottle erector machine 101;
7. Initial alarm, shortage of main flow, palletization machine 145:
No speed change.

The operating speed of the filling machine 104 is changed in the following manner when the following events occur in the palletization machine 145:
1. Disturbance, palletization machine 145:
Same speed as the bottle closure machine 113;
2. Jam, main flow, palletization machine 145:
Same speed as the bottle closure machine 113;
3. Initial alarm, jam, main flow, palletization machine 145:
No speed change;
4. Jam, secondary flow, palletization machine 145:
No speed change;
5. Shortage of main flow, palletization machine 145:
Same speed as the bottle closure machine 113;
6. Shortage of secondary flow, palletization machine 145:
Same speed as the bottle closure machine 113;
7. Initial alarm, shortage of main flow, palletization machine 145:
No speed change.

The operating speed of the cap sorting machine 108 is changed in the following manner when the following events occur in the palletization machine 145:
1. Disturbance, palletization machine 145:
Slow down the cap sorting machine 108;

2. Jam, main flow, palletization machine 145:
   Slow down the cap sorting machine 108;
3. Initial alarm, jam, main flow, palletization machine 145:
   No speed change;
4. Jam, secondary flow, palletization machine 145:
   No speed change;
5. Shortage of main flow, palletization machine 145:
   Speed up the cap sorting machine 108;
6. Shortage of secondary flow, palletization machine 145:
   Slow down the cap sorting machine 108;
7. Initial alarm, shortage of main flow, palletization machine 145:
   No speed change.

The operating speed of the cap aligner machine 107 is changed in the following manner when the following events occur in the palletization machine 145:
1. Disturbance, palletization machine 145:
   Same speed as the cap sorting machine 108;
2. Jam, main flow, palletization machine 145:
   Same speed as the cap sorting machine 108;
3. Initial alarm, jam, main flow, palletization machine 145:
   No speed change;
4. Jam, secondary flow, palletization machine 145:
   No speed change;
5. Shortage of main flow, palletization machine 145:
   Same speed as the cap sorting machine 108;
6. Shortage of secondary flow, palletization machine 145:
   Same speed as the cap sorting machine 108;
7. Initial alarm, shortage of main flow, palletization machine 145:
   No speed change.

The operating speed of the bottle closure machine 113 is changed in the following manner when the following events occur in the palletization machine 145:
1. Disturbance, palletization machine 145:
   Slow down the bottle closure machine 113;
2. Jam, main flow, palletization machine 145:
   Slow down the bottle closure machine 113;
3. Initial alarm, jam, main flow, palletization machine 145:
   No speed change;
4. Jam, secondary flow, palletization machine 145:
   No speed change;
5. Shortage of main flow, palletization machine 145:
   Speed up the bottle closure machine 113;
6. Shortage of secondary flow, palletization machine 145:
   Slow down the bottle closure machine 113;
7. Initial alarm, shortage of main flow, palletization machine 145:
   No speed change.

The operating speed of the bottle shoe removal machine 115 is changed in the following manner when the following events occur in the palletization machine 145:
1. Disturbance, palletization machine 145:
   Slow down the bottle shoe removal machine 115;
2. Jam, main flow, palletization machine 145:
   Slow down the bottle shoe removal machine 115;
3. Initial alarm, jam, main flow, palletization machine 145:
   No speed change;
4. Jam, secondary flow, palletization machine 145:
   No speed change;
5. Shortage of main flow, palletization machine 145:
   Speed up the bottle shoe removal machine 115;
6. Shortage of secondary flow, palletization machine 145:
   Slow down the bottle shoe removal machine 115;
7. Initial alarm, shortage of main flow, palletization machine 145:
   No speed change.

The operating speed of the labeling machine 119 is changed in the following manner when the following events occur in the palletization machine 145:
1. Disturbance, palletization machine 145:
   Same speed as the bottle shoe removal machine 115;
2. Jam, main flow, palletization machine 145:
   Same speed as the bottle shoe removal machine 115;
3. Initial alarm, jam, main flow, palletization machine 145:
   No speed change;
4. Jam, secondary flow, palletization machine 145:
   No speed change;
5. Shortage of main flow, palletization machine 145:
   Same speed as the bottle shoe removal machine 115;
6. Shortage of secondary flow, palletization machine 145:
   Same speed as the bottle shoe removal machine 115;
7. Initial alarm, shortage of main flow, palletization machine 145:
   No speed change.

The operating speeds of the coding machine 121, of the first sticker machine 122 and of the second sticker machine 123 remain unchanged when the above events occur in the palletization machine 145.

The operating speed of the sheet shrinker machine 126 is changed in the following manner when the following events occur in the palletization machine 145:
1. Disturbance, palletization machine 145:
   Slow down the sheet shrinker machine 126;
2. Jam, main flow, palletization machine 145:
   Slow down the sheet shrinker machine 126;
3. Initial alarm, jam, main flow, palletization machine 145:
   No speed change;
4. Jam, secondary flow, palletization machine 145:
   No speed change;
5. Shortage of main flow, palletization machine 145:
   Speed up the sheet shrinker machine 126;
6. Shortage of secondary flow, palletization machine 145:
   Slow down the sheet shrinker machine 126;
7. Initial alarm, shortage of main flow, palletization machine 145:
   No speed change.

The operating speed of the palletization machine 145 is changed in the following manner when the following events occur in the palletization machine 145:
1. Disturbance, palletization machine 145:
   The palletization machine 145 is stopped;
2. Jam, main flow, palletization machine 145:
   The palletization machine 145 is stopped;
3. Initial alarm, jam, main flow, palletization machine 145:
   No speed change;
4. Jam, secondary flow, palletization machine 145:
   No speed change;
5. Shortage of main flow, palletization machine 145:
   The palletization machine 145 is stopped;
6. Shortage of secondary flow, palletization machine 145:
   The palletization machine 145 is stopped;
7. Initial alarm, shortage of main flow, palletization machine 145:
   No speed change.

The operating speeds of the other machines 128, 129, 131 remain unchanged when the above events occur in the palletization machine 145.

In this context, it should be noted that the extent to which a machine is speeded up or slowed down is dependent on the respective application and the architecture of the overall process line. Suitable values for increasing or reducing the operating speed of the machines may be determined, for example, by means of the technical simulation or, in a general form, from empirical values during operation of the machine while the process line is in operation.

The totality of all of the requirements mentioned above for the purposes of controlling the operating speeds of the machines is referred to as the speed matrix.

The control process at the first hierarchy level is thus based on the predetermined speed matrix.

FIG. 5a to FIG. 5d use a functional diagram 500 for a family of functions covering all process lines in each case to show the relationship between the effective output (productivity) $Q_L$ of the process line as a function of the speeds of the machines in the process line.

As has already been described in [1], the effective output $Q_L$ is a function of the speed $v_L$ of the machine.

Each function in the family of functions has a maximum for the effective output.

The function 502 in this case corresponds to the modelled characteristic and is flanked by the functions 501 and 503, which cover a tolerance band.

The individual points of the function 502 are each associated with a speed V profile, with each individual machine in the process line in turn being associated with a nominal operating speed in each speed V profile. The association between the speed V profiles and the points of the function can be provided by a suitable mathematical function, for example digitization with a process-relevant step width.

FIG. 5a to FIG. 5d show the procedure according to the invention for process optimization, that is to say the determination and selection of the optimum speed V profile from the large number of stored speed V profiles by selection of the optimum points in the function for the case of an iterative process optimization strategy.

Figure 5B:
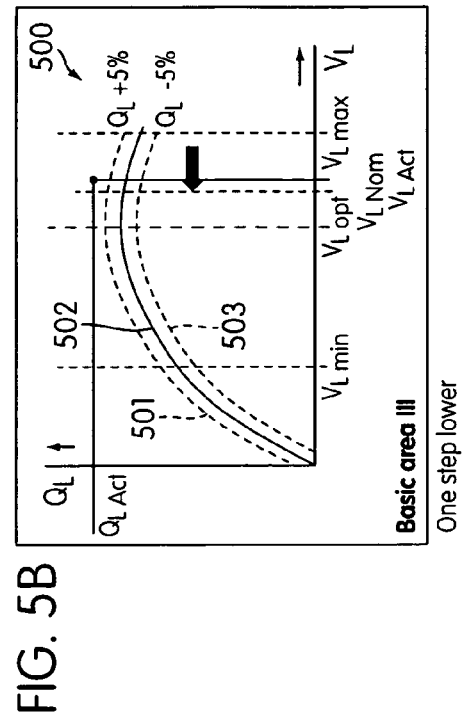
FIGS. 5a to 5d show functional diagrams illustrating process optimization based on an iterative process optimization strategy.
Figure 5D:
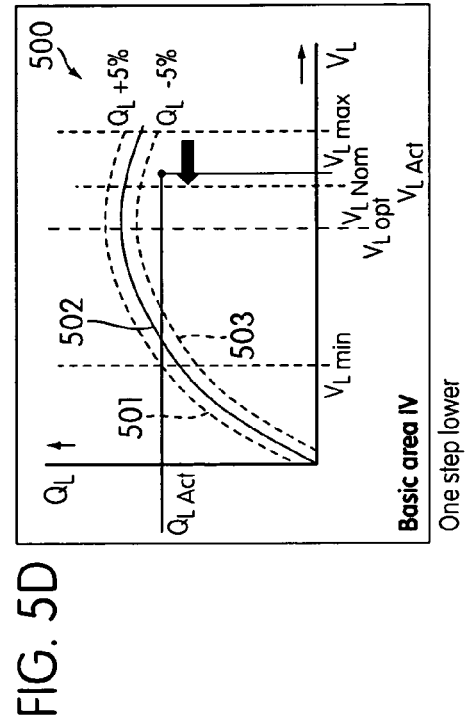

As is illustrated in FIG. 5b and FIG. 5d, in the situation where the actual speed $v_{Lact}$ is greater than the speed $v_{Lopt}$ for the maximum effective output, in other words for the speed at which the maximum effective output is reached for the respective function 502, a speed V profile which is one step lower is selected irrespective of the current productivity, that is to say the speed V profile which is immediately adjacent to the current speed V profile and for which the individual machine speeds are lower by one step is selected for subsequent control of the machines on the basis of the speed matrices described above.

Figure 5A:
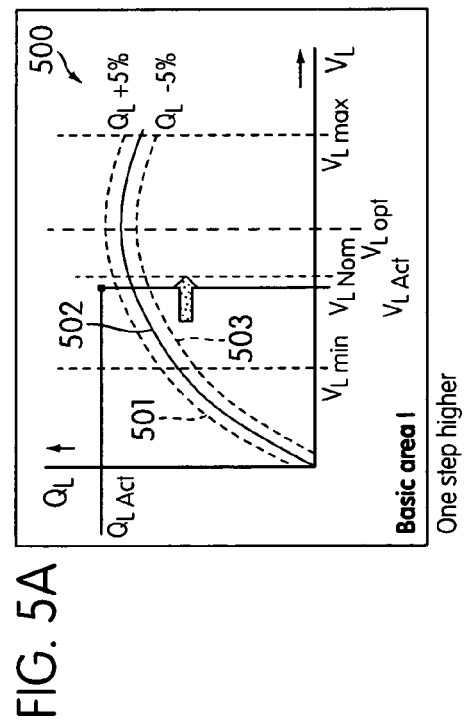
Figure 5C:
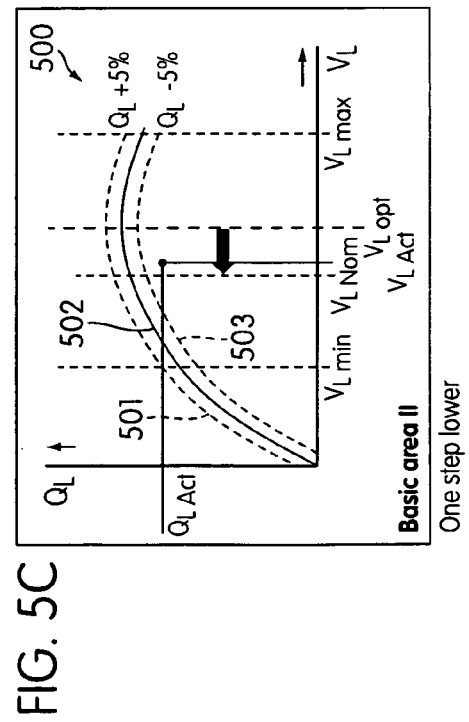

FIG. 5a and FIG. 5c show the situation in which the actual speed of the machines $v_{Lact}$ is less than the speed $v_{Lopt}$ which leads to the maximum effective output. If the selected actual speed is less than the speed $v_{Lopt}$ for the maximum effective output, then a speed V profile which is lower by one step or a speed V profile which is higher by one step is selected depending on whether the current effective output differs in the negative or positive sense from the expected effective output. If the current effective output $Q_{Lact}$ is in a tolerance band which can be predetermined, then the speed V profile which is actually used for control of the individual machines is not changed.

In the iteratively optimum process optimization strategy using the actual speed and the actual effective output $Q_{Lact}$ and the nominal effective output for the respective actual speed of the machines is obviously counteracted when there is a discrepancy of a fixed control step between the actual effective output and the nominal effective output. The iterative process optimization strategy thus leads to permanent proximity to the respectively optimum operating point when a large number of small adjustment steps are available, or in other words this leads to the selection of the respectively optimum speed V profile. This procedure has the advantage that the iterative control process allows relatively large discrepancies in the recorded data.

FIG. 6a to FIG. 6d show the procedure for gradient-based process optimization relating to the functional diagram 500.

Figure 6B:
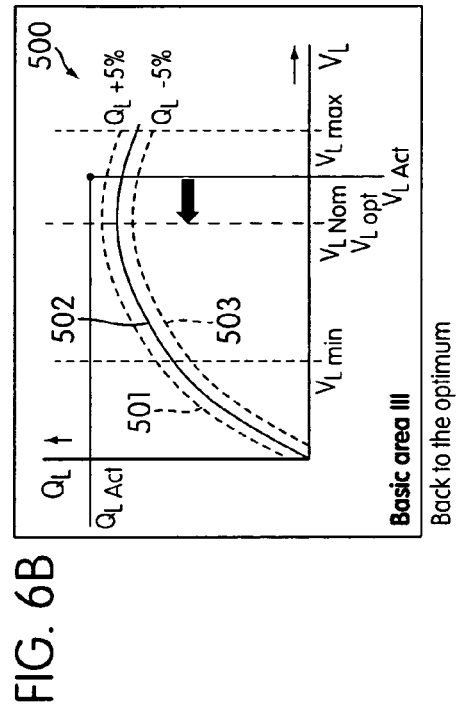
FIGS. 6a to 6d show functional diagrams illustrating process optimization on the basis of a gradient-based process optimization strategy.
Figure 6D:
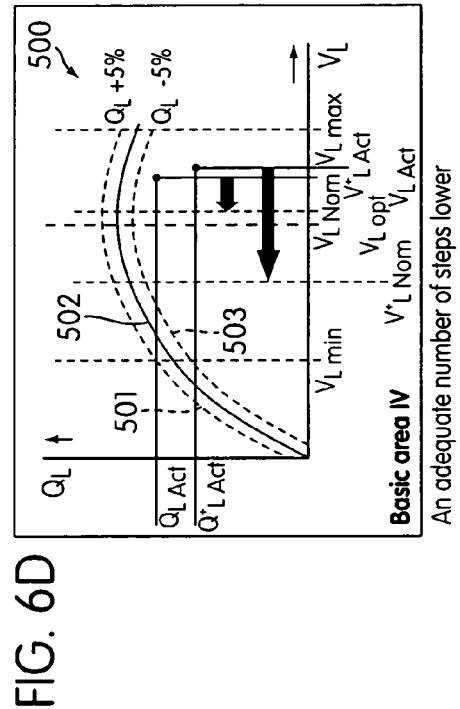

As is illustrated in FIG. 6b and FIG. 6d, in the situation where the selected actual speed $v_{Lact}$ is greater than the speed $v_{Lopt}$ which leads to the maximum effective output, then a speed V profile which is smaller by a number of steps is selected as a function of the current effective output $Q_{Lact}$, that is to say a speed V profile is selected whose speed is lower by at least one step than the currently used speed V profile, depending on the gradient of the operating point of the optimization function. The number of steps is in this case chosen to be greater the greater the discrepancy in the operating point, and vice versa.

Figure 6A:
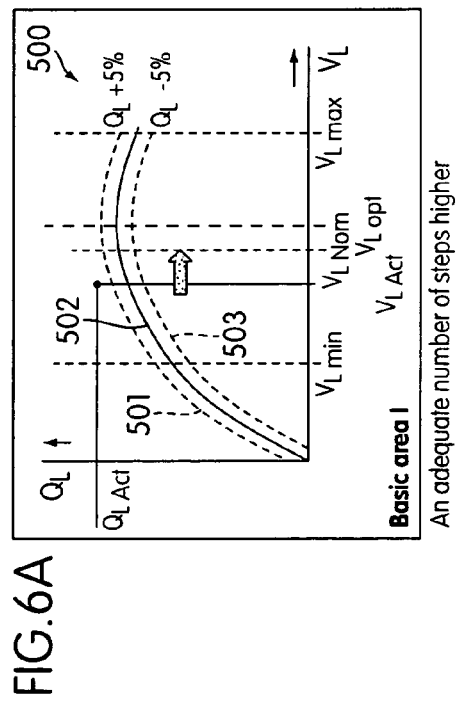
Figure 6C:
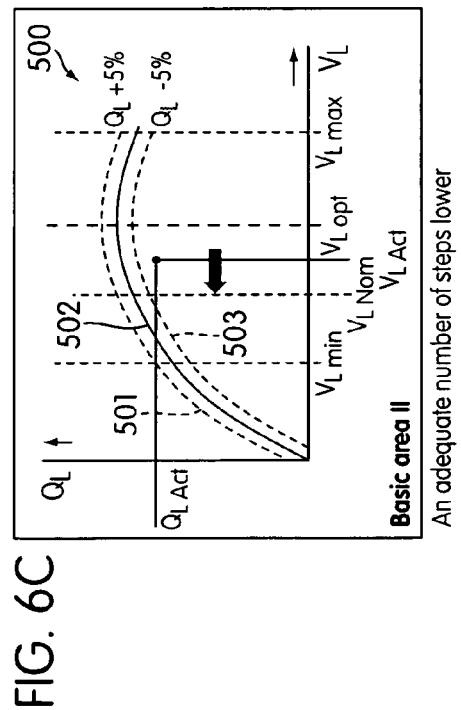

FIG. 6a and FIG. 6c show the situation in which the selected actual speed $V_{Lact}$ is less than the speed $V_{Lopt}$. In this case, a speed V profile which is less by a number of steps matched to the discrepancy or a speed V profile which is greater by a number of steps matched to the discrepancy is selected depending on whether the current effective output $Q_{Lact}$ differs in the negative or positive sense from the expected effective output. If the current effective output $Q_{Lact}$ is in a predeterminable tolerance band, then this process optimization strategy does not result in any reselection of the speed V profile to be used at that time, either.

A number of steps which is adequate for the respective discrepancy is selected in the gradient-based process optimization strategy using the actual speed and the actual effective output $Q_{Lact}$ as well as the nominal effective output for the respective actual speed when there is a discrepancy between the actual effective output $Q_{Lact}$ and the nominal effective output, in order to counteract the respective discrepancy. The number of steps is in this case dependent on the gradient of the respective operating point on the respectively selected optimization function. Since the gradient-based procedure thus requires a small number of adjustment steps, the optimum operating point and thus the selection of the respectively optimum speed V profile can be reached approximately with a relatively small number of selection steps. This process optimization strategy allows operation with a broad recorded data tolerance band.

FIG. 7a to FIG. 7d show the procedure for a model-based optimization strategy.

Figure 7A:
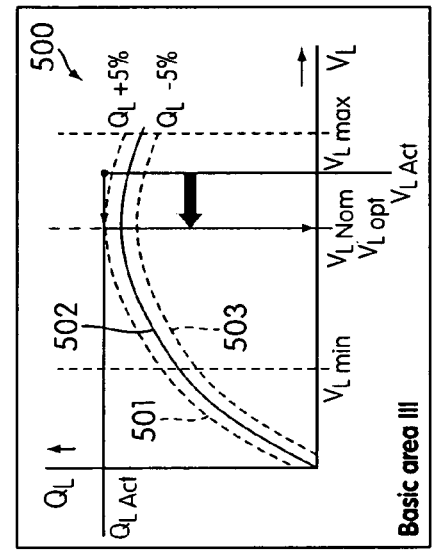
FIGS. 7a–7d show functional diagrams illustrating process optimization on the basis of a model-based process optimization strategy.
Figure 7B:
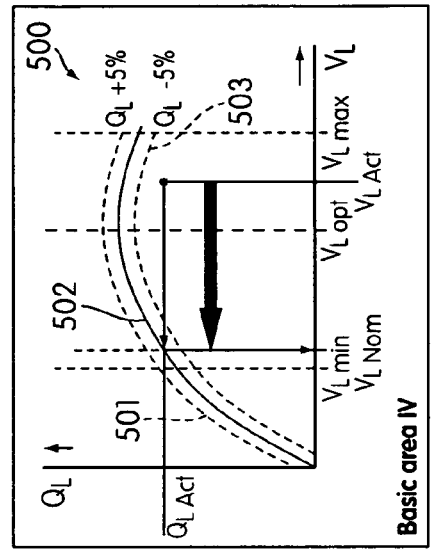
Figure 7C:
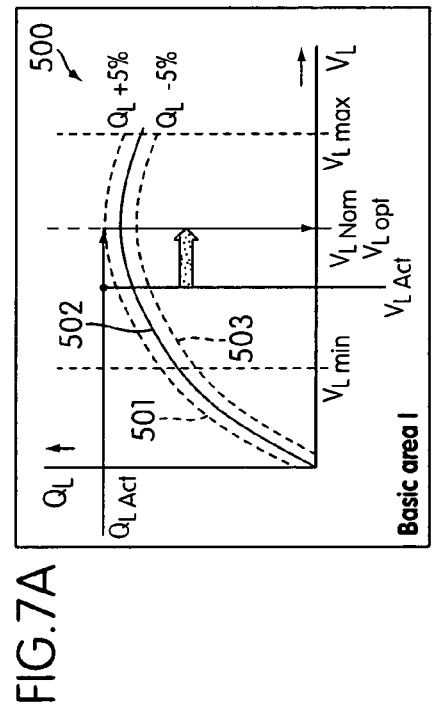
Figure 7D:
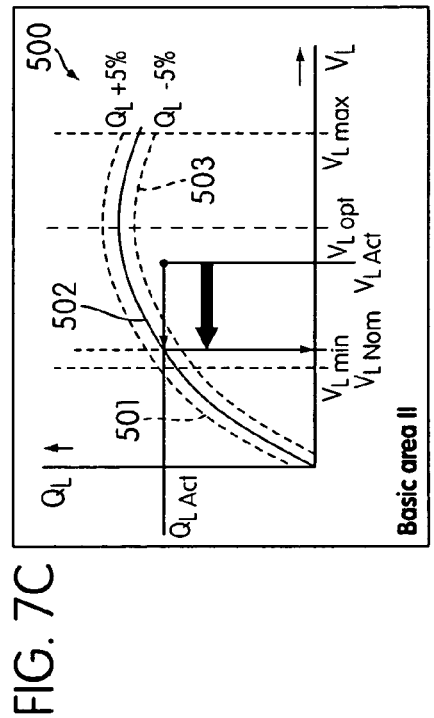

FIG. 7b and FIG. 7d illustrate the situation in which the selected actual speed $V_{Lact}$ is greater than the speed $V_{Lopt}$ for the maximum effective output. If the current effective output is higher than the expected effective output, that operating speed $V_{Lopt}$ of the machines which corresponds to the optimum effective output is selected as the optimum speed V profile. If the current effective output is less than the expected effective output, a speed V profile is selected whose expected effective output coincides with the current effective output.

If the selected actual speed $V_{Lact}$ is less than the speed $V_{Lopt}$ which leads to the maximum effective output, as is illustrated in FIGS. 7a and 7c, then a speed V profile is selected whose expected effective output coincides with the current effective output. The direction of the speed change is in this case dependent on whether the current effective output is greater than or less than the expected effective output at the actual speed. However, the maximum increase in speed in this case does not exceed the speed $v_{Lopt}$ which leads to the maximum effective output.

Once again, in this process optimization strategy as well, no new speed V profile is selected when the current effective output $Q_{Lact}$ is in a predeterminable tolerance band.

In the case of the model-based process optimization strategy, the optimum speed V profile is selected using the actual speed, the actual effective output $Q_{Lact}$ and the respective complete characteristic (the respective complete model) of the nominal effective output as a function of the respective operating speed of the machines. When there is a discrepancy between the actual effective output $Q_{Lact}$ and the nominal effective output, the actual speed of the machines is predetermined which corresponds to the characteristic, that is to say to the model of the machines. The number of steps for selection of the respective optimum speed V profile is in this case directly dependent on the model of the machines. This process optimization strategy has the particular advantage that the optimum operating point can be set very precisely with a minimum number of adjustment steps being required, that is to say selection steps for the respective speed V profile. The adjustment dynamic response and the control accuracy of the reference variables are directly proportionally dependent on the data quality.

As used herein, and in particular as used herein to define the elements of the claims that follow, the articles "a" and "an" are synonymous and used interchangeably with "at least one" or "one or more," disclosing or encompassing both the singular and the plural, unless specifically defined otherwise. The conjunction "or" is used herein in its inclusive disjunctive sense, such that phrases formed by terms conjoined by "or" disclose or encompass each term alone as well as any combination of terms so conjoined, unless specifically defined otherwise. All numerical quantities are understood to be modified by the word "about," unless specifically modified otherwise or unless an exact amount is needed to define the invention over the prior art.

LIST OF REFERENCE SYMBOLS

100 Machine arrangement
101 Bottle erector machine
102 Bottle
103 Conveyor belt
104 Filling machine
105 Filled bottle
106 Conveyor belt
107 Cap aligner machine
108 Cap sorting machine
109 Conveyor belt
110 Cap
111 Bottle provided with cap
112 Conveyor belt
113 Bottle closure machine
114 Closed bottle
115 Bottle shoe removal machine
116 Bottle shoe
117 Conveyor belt
118 Secondary input bottle erector machine
119 Labeling machine
120 Labeled bottle
121 Coding machine
122 First sticker machine
123 Second sticker machine
124 Marked bottle
125 Secondary conveyor belt
126 Sheet shrinker machine
127 Main conveyor belt
128 Third sticker machine
129 Fourth sticker machine
130 Completely marked bottle
131 Carton packaging machine
132 Multiple pack erector machine
133 Carton
134 Carton with bottles in it
135 Conveyor belt
136 Carton closure machine
137 Closed cartons
138 Conveyor belt
139 Carton label printing machine
140 Printed cartons
141 Conveyor belt
142 Check weighing facility
143 Weighed carton
144 Conveyor belt
145 Palletization machine
146 First fieldbus
147 Belt control unit
148 Second fieldbus
149 Process stabilization control computer
150 Measurement data database management computer
151 Ethernet
152 Process optimization computer
153 Simulation computer
201 Screen surface simulation program
202 Actual speed
203 MTBF
204 MTTR
205 Process optimization program
300 Machines
400 Block diagram
First speed V profile
Second speed V profile
Third speed V profile
m-th speed V profile
405 Double-headed arrow to symbolize the change in the speeds during the course of process stabilization of a selected speed V profile
406 Double-headed arrow to symbolize the selection of different speed V profiles
407 Nominal operating speed, machine
500 functional diagram
501 Function, effective output
502 Function, effective output
503 Function, effective output

What is claimed is:

1. A method of computer-aided control of a process comprising a plurality of machines coupled to one another in series, comprising the steps of:
    (a) recording one or more machine sensor values;
    (b) controlling process stabilization with a machine control matrix selected from a plurality of machine control matrices, wherein the selected matrix controls process stabilization using at least one of the recorded machine sensor values, and wherein each of the plurality of machine control matrices stores one or more nominal control values for the controlled machines;
    (c) determining process optimization using a predeterminable criterion and at least one of the recorded machine sensor values;
    (d) selecting an optimum machine control matrix from the plurality of machine control matrices on the basis of the process optimization; and
    (e) using the selected matrix to control the machines.

2. The method of claim 1, wherein nominal speed values at which the respective machines are intended to be operated are stored in the selected machine control matrix.

3. The method of claim 2, wherein the speed values in the machine control matrix are allocated to the machines in accordance with a speed V profile.

4. The method of claim 1, wherein the nominal control value(s) of the selected machine control matrix are varied, and process is controlled on the basis of the varied nominal control value(s).

5. The method of claim 1, wherein the selected matrix comprises a computer-aided simulation of the plurality of machines coupled in series, and the process optimization is carried out on the basis of the computer-aided simulation.

6. The method of claim 1, wherein the process optimization is carried out in order to maximize process output.

7. The method of claim 1, wherein at least one of the machines is a processing machine.

8. The method of claim 7, wherein at least one of the machines is a packaging machine.

9. The method of claim 1, wherein at least one of the machines is in the form of one of the following machines:
bottle erector machine
material filling machine
cap sorting machine
cap aligner machine
bottle closure machine
bottle shoe lifter machine
bottle labeling machine,
coding machine
sticker machine
sheet shrinkage machine
multiple pack aligner machine,
carton packaging machine
carton closure machine
carton label printing machine
checking balance
palletization machine.

10. The method of claim 1, wherein the process optimization is carried out repeatedly as a function of a predetermined repetition criterion.

11. The method of claim 10, wherein the process optimization is carried out repeatedly in a predeterminable repetition period.

12. The method of claim 1, wherein the process optimization is carried out using one or more of the following optimization methods:
an iterative optimization method,
a gradient-based optimization method, or
a model-based optimization method.

13. A control device for controlling a plurality of machines that are coupled in a process in series with one another, comprising:
(a) a recording device for recording of machine sensor values;
(b) a control unit for process-stabilizing control of the machines in accordance with a machine control matrix that is selected from a plurality of machine control matrices, each machine control matrix storing nominal control values for the controlled machines and using at least one recorded machine sensor value;
(c) a process optimization unit for optimizing the process on the basis of a predeterminable criterion using at least one recorded machine sensor value; and
(d) a machine control matrix selection unit that determines and selects an optimum machine control matrix, on the basis of the process optimization, from the plurality of machine control matrices, which optimum machine control matrix is then used to control the machines.

* * * * *